(12) United States Patent
Gordy et al.

(10) Patent No.: US 7,866,024 B2
(45) Date of Patent: Jan. 11, 2011

(54) METHOD OF MANUFACTURE FOR A PUSH-PULL CABLE ASSEMBLY

(75) Inventors: Donald Gene Gordy, Moberly, MO (US); Gregory Phillip Ruhlander, Hannibal, MO (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 724 days.

(21) Appl. No.: 11/849,604

(22) Filed: Sep. 4, 2007

(65) Prior Publication Data
US 2009/0056099 A1 Mar. 5, 2009

(51) Int. Cl.
B23P 11/00 (2006.01)
B23P 25/00 (2006.01)
F16C 1/10 (2006.01)

(52) U.S. Cl. .............. 29/434; 29/527.1; 74/500.5; 74/502.4; 74/502.5; 74/502.6; 264/279; 264/279.1

(58) Field of Classification Search .......... 29/434, 29/453, 460, 527.1, 527.2; 74/500.5, 502.4, 74/502.5, 502.6; 264/271.1, 274, 279, 279.1
See application file for complete search history.

(56) References Cited

U.S. PATENT DOCUMENTS

| 1,743,506 | A | * | 1/1930 | Watson et al. | 174/113 R |
| 2,338,524 | A | * | 1/1944 | McCabe | 264/263 |
| 4,091,062 | A | * | 5/1978 | Nelson | 264/85 |
| 4,092,396 | A | * | 5/1978 | McCartney et al. | 264/249 |
| 4,175,450 | A | * | 11/1979 | Bennett | 74/502.4 |
| 4,238,974 | A | | 12/1980 | Fawcett | |
| 4,348,348 | A | * | 9/1982 | Bennett et al. | 264/255 |
| 4,380,178 | A | * | 4/1983 | Bennett et al. | 74/502.4 |
| 4,649,010 | A | | 3/1987 | Bennet et al. | |
| 4,829,845 | A | * | 5/1989 | Suzuki | 74/502.4 |
| 5,337,621 | A | | 8/1994 | Spease | |
| 5,435,052 | A | | 7/1995 | Spease | |
| 5,493,934 | A | * | 2/1996 | Kelley | 74/502.6 |
| 5,823,063 | A | * | 10/1998 | Nagle et al. | 74/502.6 |
| 5,862,580 | A | | 1/1999 | Petrucccello et al. | |
| 5,862,710 | A | * | 1/1999 | Koenig | 74/502.4 |
| 5,911,790 | A | * | 6/1999 | Bates et al. | 74/502.4 |
| 6,105,232 | A | * | 8/2000 | Malone et al. | 29/434 |
| 6,119,543 | A | | 9/2000 | Webb | |
| 6,185,806 | B1 | * | 2/2001 | Malone et al. | 29/434 |
| 6,308,393 | B1 | * | 10/2001 | Haynes et al. | 29/434 |
| 6,308,395 | B1 | * | 10/2001 | Webb | 29/453 |
| 6,938,317 | B1 | * | 9/2005 | Bolaski | 29/402.01 |
| 2001/0029804 | A1 | * | 10/2001 | Meyer | 74/502.4 |
| 2004/0129105 | A1 | * | 7/2004 | Gordy et al. | 74/502.4 |

* cited by examiner

Primary Examiner—Jermie E Cozart
(74) Attorney, Agent, or Firm—Porter Wright Morris & Arthur LLP; Richard M. Mescher; Dean B. Watson

(57) ABSTRACT

A method of manufacturing is disclosed for a motion transmitting cable assembly having a conduit and a core longitudinally movable within the conduit. The method includes the steps of securing a conduit abutment fitting to an end of the conduit, inserting the core through the conduit, placing an end of the core into a mold while the core is extending through the conduit, injection over-molding a core attachment onto the end of the core, removing the core attachment from the mold. Finally, at least a portion of a guide tube over the juncture of the core and the core attachment.

18 Claims, 16 Drawing Sheets

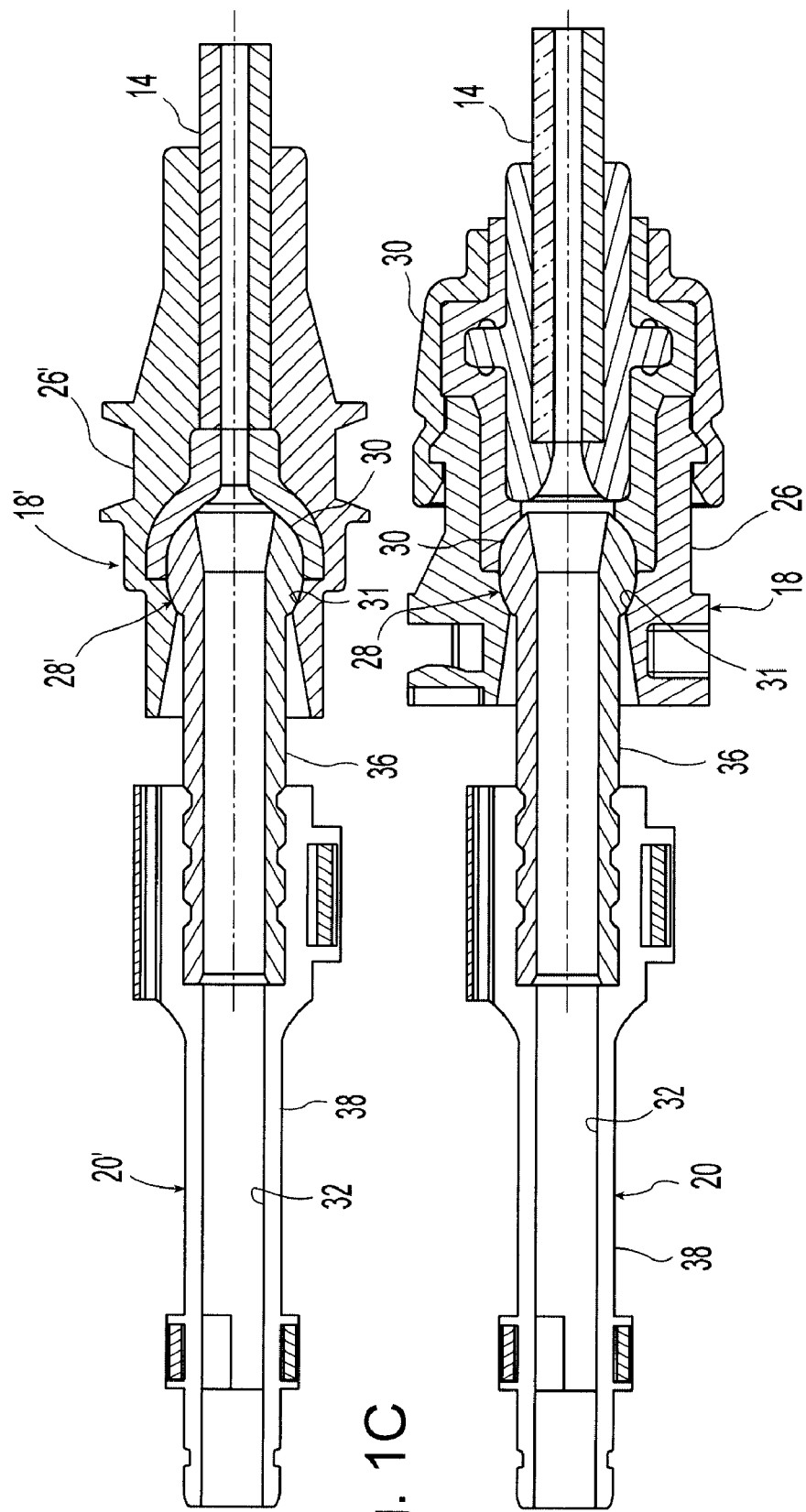

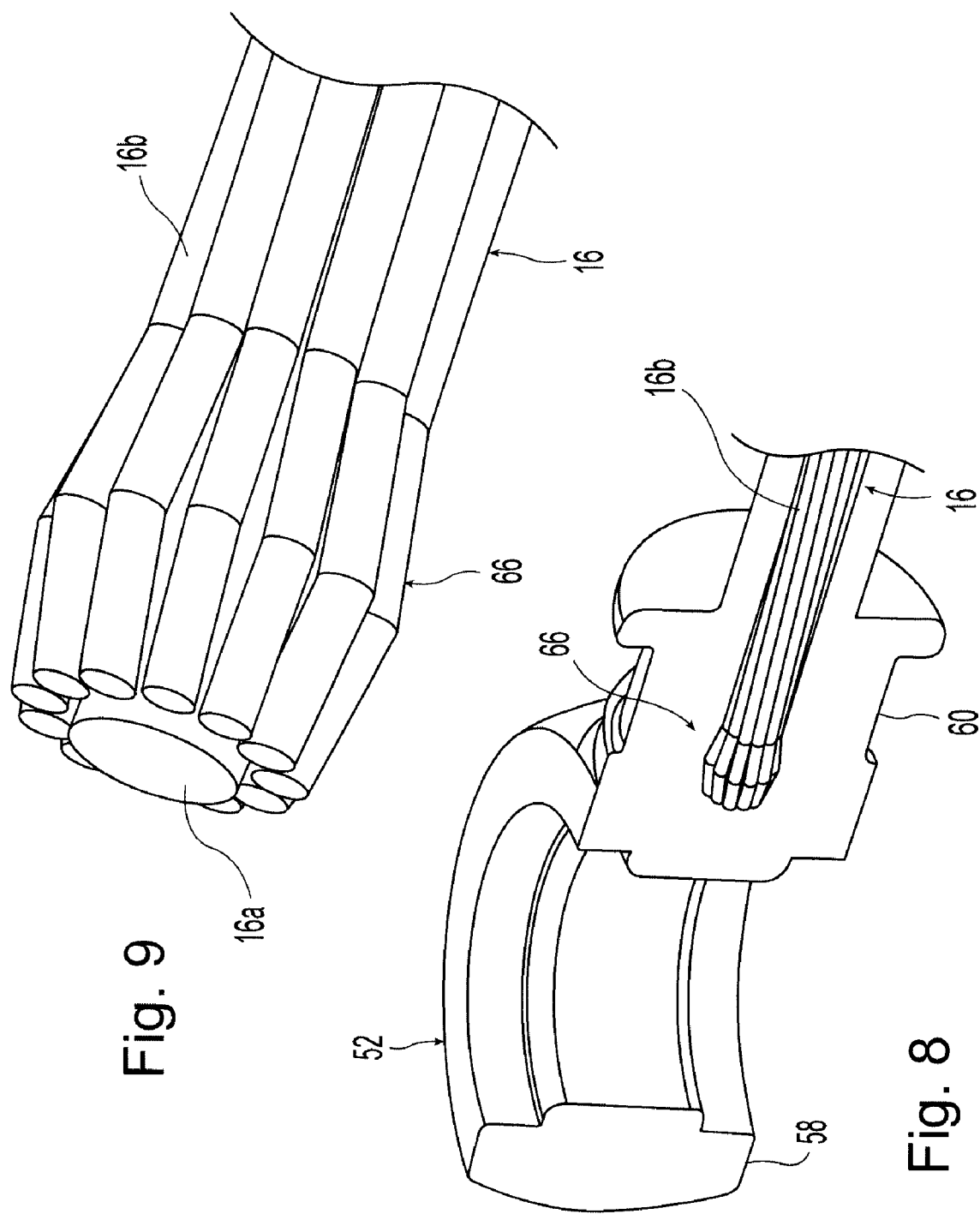

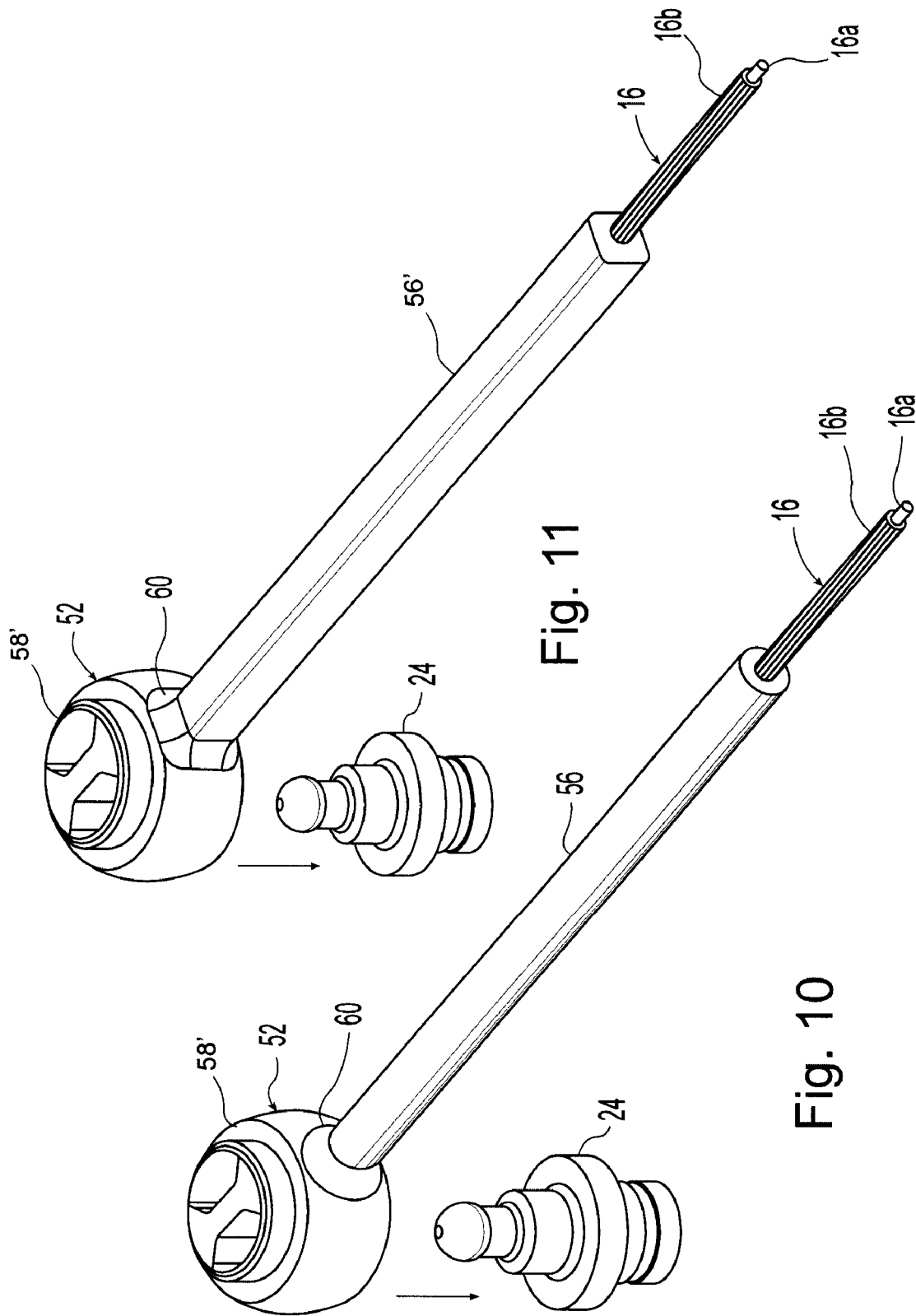

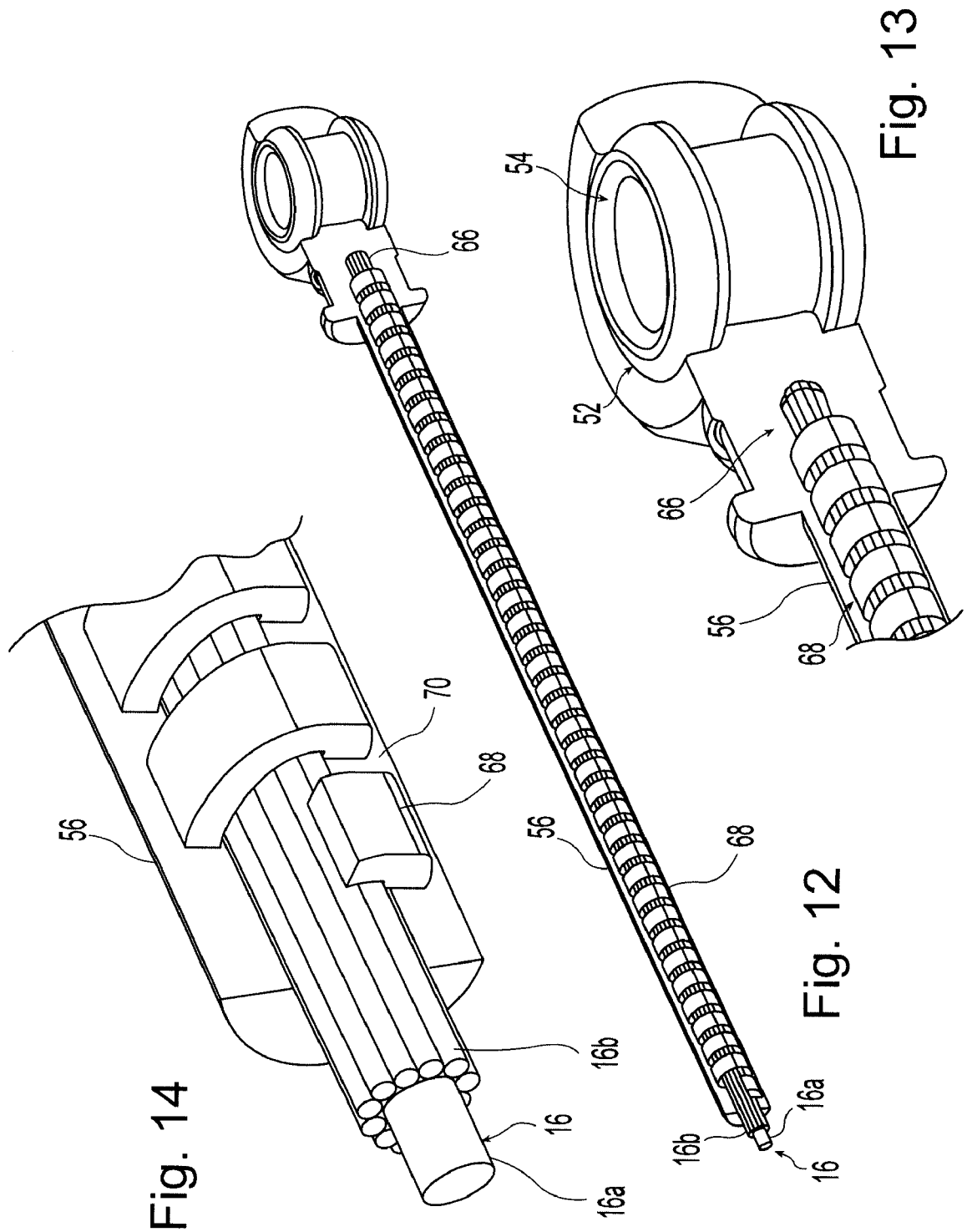

METHOD OF MANUFACTURE FOR A PUSH-PULL CABLE ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a motion-transmitting push-pull cable assembly and, more particularly, to a method of manufacturing the push-pull cable assembly.

BACKGROUND OF THE INVENTION

Motion-transmitting control cable assemblies, sometimes referred to as "Bowden cables" or "push-pull cables," are used for transmitting both force and travel along a path in aircraft, automotive, and marine environments. These cable assemblies can be used for transmitting force and motion in push/pull type applications. One example of a specific use of such remote control cable assemblies is positioning automatic transmission shift members in automobiles.

A motion-transmitting remote control cable assembly typically includes a flexible core slidably enclosed within a flexible outer sheath or conduit. The core is adapted at one end to be attached to a member to be controlled whereas the other end is attached to an actuator for longitudinally moving the core element within the outer sheath. The ends of the outer sheath are secured by conduit abutment fittings to support structures or abutment members. Typically, steel rods are crimped to ends of the core. Each steel rod typically has an over-molded terminal on the end of the rod which can be connected to the control member and the actuator. The rod ends or core attachments are relatively heavy and expensive to manufacture. Additionally, the rod end or core attachment is typically slidably received in a guide tube extending from the conduit abutment fitting with the core meeting the steel rod within the guide tube. Such a structure limits the available manufacturing and assembly methods for the cable assembly.

In the automobile industry, there is a never ending desire to simplify and/or speed up the assembly process. There is also a never ending desire to reduce cost and weight of components without negatively affecting performance. Accordingly, there is a need in the art for an improved method of manufacturing a cable assembly.

SUMMARY OF THE INVENTION

The present invention provides a method of manufacturing a cable assembly which addresses at least some of the above-noted problems of the related art. According to the present invention, a method of manufacturing a motion transmitting cable assembly comprises the steps of, in combination, securing a conduit abutment fitting to an end of the conduit, inserting the core through the conduit, placing an end of the core into a mold while the core is extending through the conduit, injection over-molding a core attachment onto the end of the core, removing the core attachment from the mold, and attaching at least a portion of a guide tube over the juncture of the core and the core attachment.

According to another aspect of the present invention, a method of manufacturing a motion transmitting cable assembly comprises the steps of, in combination, securing a first conduit abutment fitting to a first end of the conduit and a second conduit abutment fitting to a second end of the conduit, inserting the core through the conduit, placing a first end of the core into a first mold while the core is extending through the conduit, placing a second end of the core into a second mold while the core is extending through the conduit, simultaneously injection over-molding first and second core attachments onto the first and second ends of the core respectively, removing the first and second core attachments from the mold, attaching at least a portion of a first guide tube over the juncture of the core and the first core attachment, and attaching at least a portion of a second guide tube over the juncture of the core and the first core attachment.

From the foregoing disclosure and the following more detailed description of various preferred embodiments it will be apparent to those skilled in the art that the present invention provides a significant advance in the technology of manufacturing control cable assemblies. Particularly, the invention provides an easily manufactured, low cost and low weight device which maintains desired performance requirements. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1B is an enlarged cross-sectional view of a first end of the cable assembly of FIG. 1, wherein the core and core attachment are removed for clarity;

FIG. 1C is an enlarged cross-sectional view of a second end of the cable assembly of FIG. 1, wherein the core and core attachment are removed for clarity;

FIG. 8 is an enlarged, fragmented perspective view of a variation of the core attachment of FIGS. 6 and 7;

FIG. 9 is an enlarged, fragmented perspective view of an end of a core to which the core attachment is formed as shown in FIG. 8;

FIG. 10 is a perspective view similar to FIG. 6 but showing another variation of the core attachment of FIGS. 6 and 7;

FIG. 11 is a perspective view similar to FIG. 6 but showing another variation of the core attachment of FIGS. 6 and 7;

FIG. 12 is a perspective view similar to FIG. 7 but showing another variation of the core attachment of FIGS. 6 and 7;

FIG. 13 is a fragmented perspective view, partially in cross-section, of a forward end of the core attachment of FIG. 12;

FIG. 14 is a perspective view, partially in cross-section, of a rearward end of the core attachment of FIG. 12;

Figure 1:
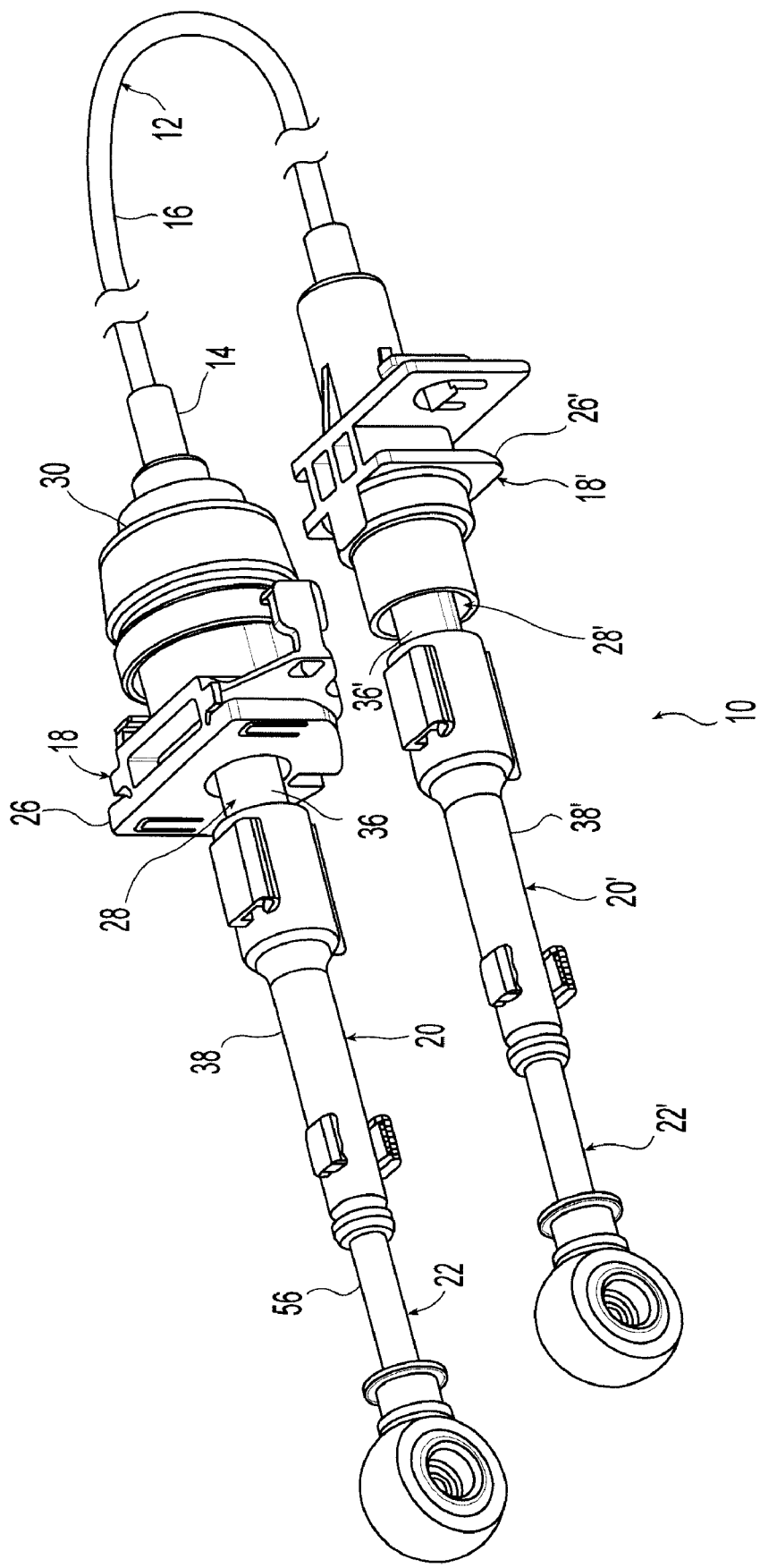
FIG. 1 is a perspective view of a push-pull cable assembly according a preferred embodiment of the present invention.

It should be understood that the appended drawings are not necessarily to scale, presenting a somewhat simplified representation of various preferred features illustrative of the basic principles of the invention. The specific design features of the cable assembly as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the cable assemblies illustrated in the drawings. In general, up or upward refers to an upward direction generally in the plane of the paper in FIGS. 1 and 17 and down or downward refers to a downward direction generally in the plane of the paper in FIGS. 1 and 17. Also in general, fore or forward refers to a direction generally toward the left in the plane of the paper in FIGS. 1 and 17, that is toward the end of the cable core, and aft or rearward refers to a direction generally toward the right in the plane of the paper in FIGS. 1 and 17, that is away from the end of the cable core.

DETAILED DESCRIPTION OF CERTAIN PREFERRED EMBODIMENTS

It will be apparent to those skilled in the art, that is, to those who have knowledge or experience in this area of technology, that many uses and design variations are possible for the motion-transmitting control cable assemblies disclosed herein. The following detailed discussion of various alternative and preferred embodiments will illustrate the general principles of the invention with reference to a push-pull cable assembly for use with a motor vehicle transmission system. Other embodiments suitable for other applications will be apparent to those skilled in the art given the benefit of this disclosure.

The term "snap-fit" or "snap-lock" is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" is used herein and in the claims to mean a member made of a single continuous material, such as, for example a molded component. The term "integral" is used herein and in the claims to mean two or more members that are rigidly secured together such as, for example, two members connected by over-molding, fasteners or the like.

Referring now to the drawings, FIG. 1 shows a push-pull cable assembly 10 according to a preferred embodiment of the present invention which connects a transmission assembly to a shifter assembly of a motor vehicle, such as an automobile. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission system, it is also noted that the present invention can be utilized with other motor vehicle systems such as, for example, a parking brake, accelerator, hood release, brake release, trunk release, park lock, tilt wheel control, fuel filler door, and/or hydraulic control cables. While the illustrated embodiments of the present invention are particularly adapted for the transmission end of the cable, it is further noted that features of the present invention can be utilized at the shifter end of the cable.

Figure 1A:
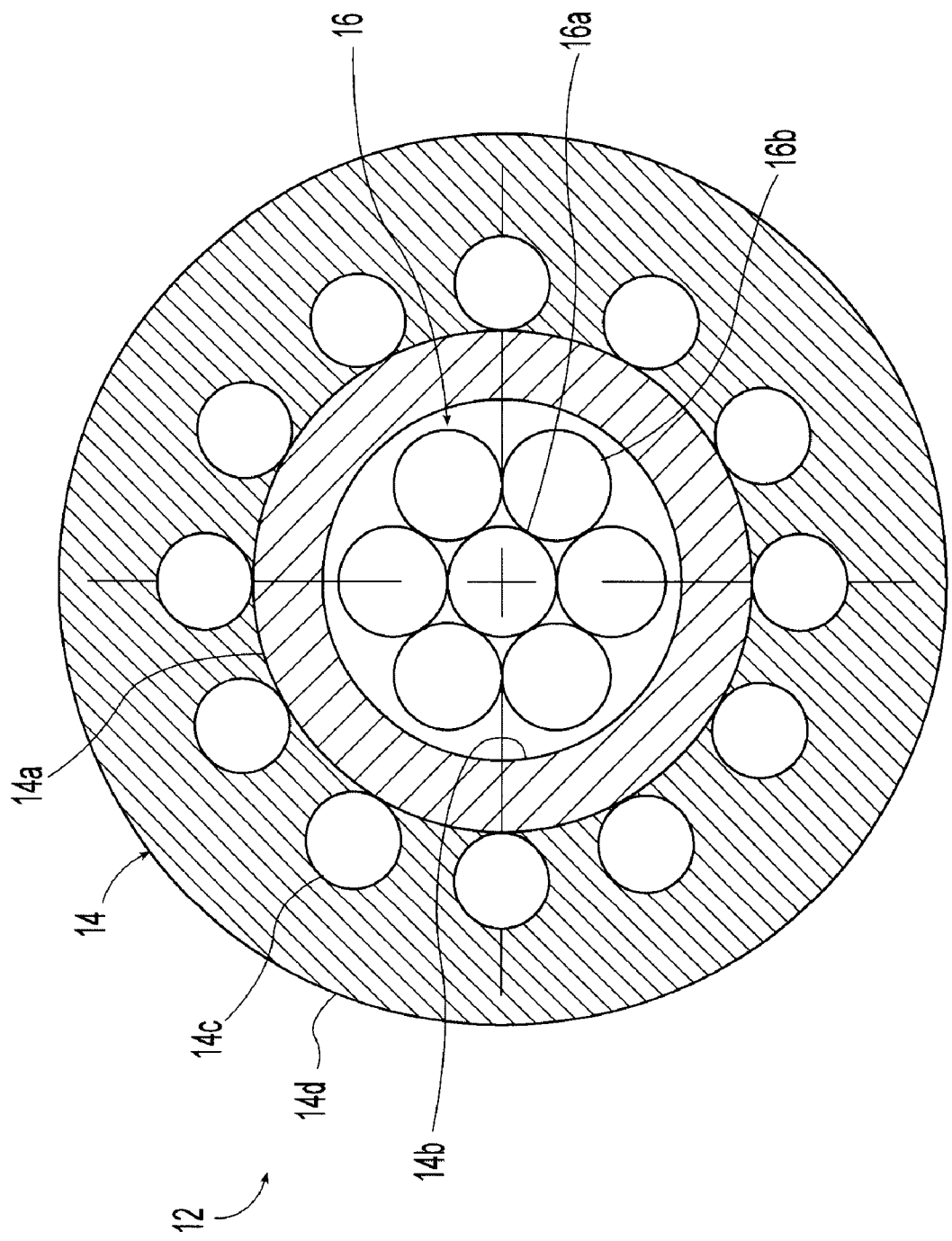
FIG. 1A is an enlarged cross-sectional view of a cable of the cable assembly of FIG. 1.

As best shown in FIGS. 1 and 1A, the illustrated push/pull cable assembly 10 includes a push-pull cable 12 having a flexible outer sheath or conduit 14 and a flexible inner core 16 longitudinally slidable within the conduit 14. For push-pull applications in automotive applications, the conduit 14 typically includes an interior thermoplastic tube or liner 14a. The liner 14a forms the inside diameter or passage 14b of the conduit 14. Exterior to the liner 14a, a reinforcing element 14c, such as a plurality of metal wires helically wrapped about the liner 14a, is provided to add strength to the thermoplastic liner 14a. The reinforcing element 14c gives added strength for the compression and tension loads seen in push-pull applications. After the reinforcing element 14c is applied about the liner 14a, an outer coating or jacket 14d of flexible thermoplastic material is applied to hold the reinforcement member 14c in relation to the liner 14a and fully encapsulate the sub-assembly. The outer coating 14d is typically applied through a high temperature extrusion process. Through extrusion, an outside diameter is formed around the sub-assembly and the conduit 14 can be cut to a desired length.

Alternatively, the conduit 14 can be constructed to eliminate the use of metal in the reinforcing element 14c so that the conduit 14 is constructed entirely of non-metallic materials. Optional materials for the reinforcing element 14c may include thermoplastic wires such as Nylon Monofilament 610, reinforced Nylon 66, or any suitable reinforced thermoplastic in extrusion form, such as a thermoplastic wire. Alternate bundle configurations and alternate shapes can be arranged to achieve a final form or interlocking design. The amount of load carrying capability of the conduit 14 can be customized per application by altering the design of the reinforcing element. As well, a reinforcing element 14c may include a thermoplastic that makes use of carbon nanotube (CNT) technology. Such a reinforcing element 14c may have the strength equivalency of steel and be quite suitable for conduit construction, all the time replacing metal from the conduit construction.

Alternatively, the reinforcing element 14c may be constructed of composite fibers such as carbon, fiberglass, or Kevlar. There are multiple options to arranging the reinforcing element 14c. The shape of the individual elements can vary along with element size, helical pattern, and layers of wrap. A multi-layer design may be favorable with cross-weaving for strength. It is noted that the conduit 14 can alternatively have any other suitable construction depending upon the requirements of a particular application. As described above, the conduit 14 can be formed of a combination of metal and plastic or other nonmetallic materials, or of entirely plastic or other nonmetallic materials depending upon the requirements of a particular application.

Use of the above described constructions can eliminate metal from the conduit 14. Weight savings and cost may be reduced by the above methods of construction. As well, the conduit 14 may see increased flexibility as compared to conduit 14 made with steel wire construction. Steel wires are often rigid and the final construction of the conduit 14 maintains that rigidity after completion. This rigidity of the conduit 14 is sometimes an issue when the cables 12 are being installed and routed throughout a vehicle' structure. The above methods may improve the flexibility of the cable 12 and allow a smaller radius bend condition to exist when the cable 12 is installed in a vehicle.

The core 16 typically consists of a strand assembly made up of metal wire. The metal wires are wound in different configurations depending upon the application. The core 16 is used for push-pull loading and typically has a center wire 16a, or a small wire bundle. To strengthen the center wire 16a, a reinforcing element 16b is provided such as, for example, a plurality of outer wires, or wire bundles, helically wound around the center wire 16a. As with the reinforcing element 14c for the conduit liner 14a, the reinforcing element 16b for the core 16 provides support for the center wire 16a.

Alternatively, the core 16 can be constructed to eliminate the use of metal so that the core 16 is constructed entirely of non-metallic materials. The center wire 16a and the outer wires 16b can be made of nonmetallic materials such as, Nylon Monofilament 610, reinforced Nylon 66, or any suitable reinforced thermoplastic in extrusion form. As in the conduit construction, alternate bundle configurations and alternate shapes can be arranged to achieve a final form or interlocking design for the core. Design of the core 16 can also make use of new technologies in thermoplastics such as the above mentioned carbon nanotube modifications for strength. The final nonmetallic core may consist of a combination of thermoplastic wires plus some form of fiber wrap. As with the conduit construction, the reinforcing element 16b for the core 16 may be constructed of composite fibers such as carbon, fiberglass, or Kevlar. There are multiple options to arranging the reinforcing element 16b. The shape of the individual reinforcing elements 16b can vary along with element size, helical pattern, and layers of wrap. A multi-layer design may be favorable with cross-weaving for strength. The goal is to provide strength for both tension and compression loading.

It is noted that the core 16 can alternatively have any other suitable construction depending upon the requirements of a particular application. As described above, the core 16 can be formed of metal, plastic or other nonmetallic materials, or a combination of metal and plastic or other nonmetallic materials depending upon the requirements of a particular application.

If the above nonmetallic constructions for the conduit 14 and the core 16 are utilized along with the use of thermoplastic core attachments 22 (as described in more detail hereinafter), then a push-pull cable assembly 10 could be constructed without the use of metal in any of the components. Typical conduit abutment fittings already take advantage of the use of thermoplastics and thermo-elastic polymers. With the above mentioned constructions, an "All-Plastic" cable assembly is possible.

As best shown in FIGS. 1 and 1B, a first end of the conduit 14 is secured to a conduit abutment fitting assembly or end fitting assembly 18. A guide tube 20 extends from the forward end of the conduit abutment fitting assembly 18. The illustrated guide tube 20 is of the swivel tube type as described in more detail hereinafter. A first end of the core 16 extends longitudinally out of the first open end of the conduit 14 and partially through the conduit abutment fitting assembly 18 and is rigidly connected to a core attachment 22 within the guide tube 20. The core attachment 22 is slidably received within the guide tube 20 for sliding longitudinal movement therein. The illustrated core attachment 22 is adapted to be operatively connected to a connection pin 24 of control member such as, for example, a transmission lever. It is noted that the core attachment 22 can alternatively be adapted to be connected to the control member in any other suitable manner and/or to any other suitable type of control member. It is also noted that the cable assembly 10 can alternatively be provided with an adjuster of any suitable type (for example, see the adjuster 25 in FIG. 17).

As best shown in FIGS. 1 and 1C, the second open end of the conduit 14 is secured to a second conduit abutment fitting assembly 18' and the second end of the core 16 is rigidly connected to a second core attachment 22' within a guide tube 20' of the second conduit abutment fitting assembly 18'. The illustrated second core attachment 22' is adapted to be operatively connected to a connection pin 24 of control member such as, for example, a shifter lever. It is noted that the second core attachment 22' can alternatively be adapted to be connected to the control member in any other suitable manner and/or to any other suitable type of control member.

In operation, movement of the shifter lever by the operator moves the second core attachment 22' to push or pull the core 16. The longitudinal movement of the core 16 within the conduit 14 pushes or pulls the first core attachment 22 to operate the transmission lever to change gears in a desired manner. The core attachments 22, 22' longitudinally move within the guide tubes 20, 20' to define a linear line of force as the core attachments 22, 22' are actuated to axially move within the guide tubes 20, 20'. Thus, longitudinal movement of the core 16 and the core attachments 22, 22' actuates the control member. The flexible conduit and core 14, 16 allow the cable 12 to be routed along a desired path, which is typically not linear. The illustrated guide tubes 20, 20' are swivel type guide tubes which can pivot to allow the orientation of the core attachments 22, 22' relative to the conduit abutment fitting assemblies 18, 18' to account for rotational motion of the control members.

Figures 2, 3:
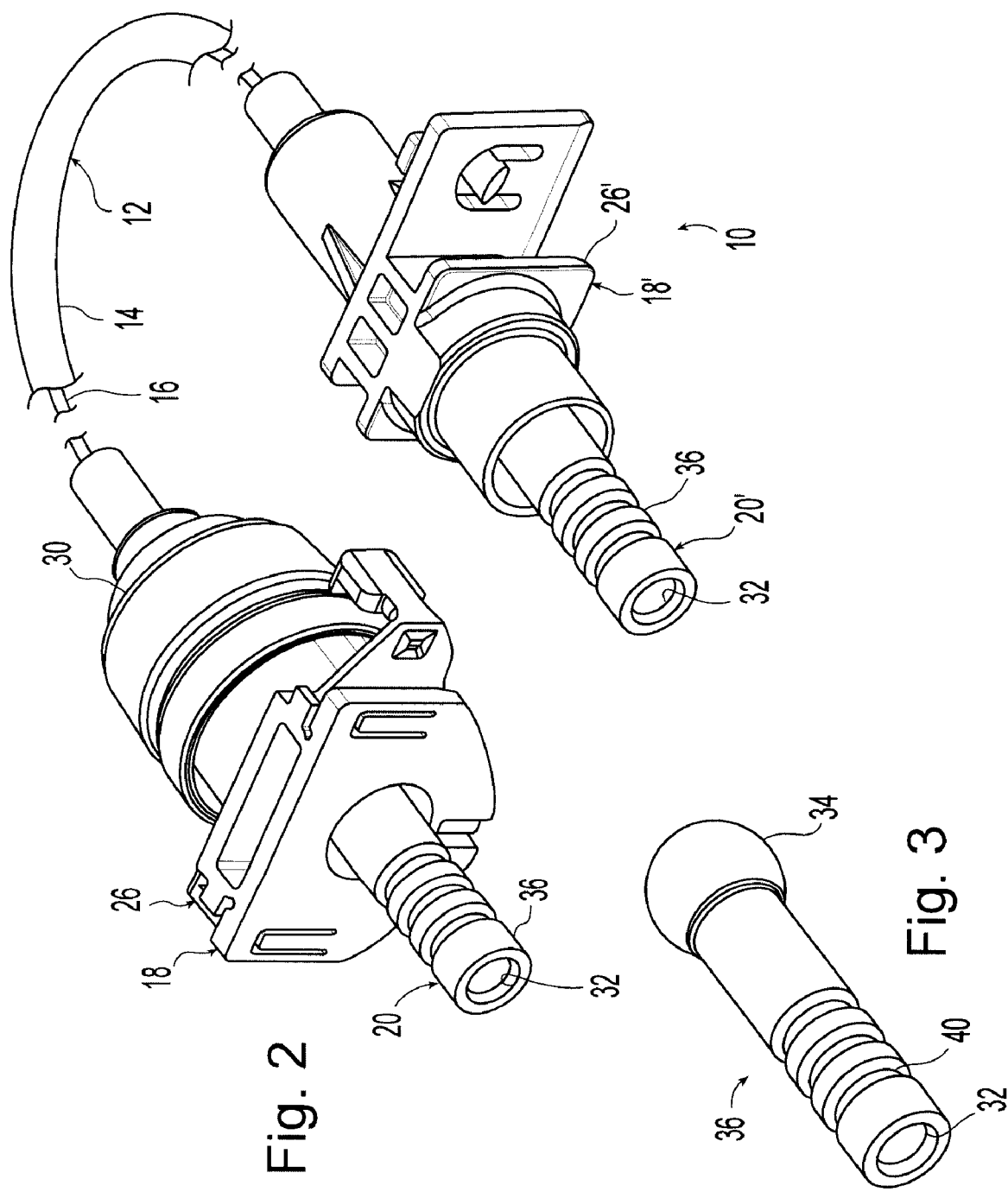
FIG. 2 is a perspective view of a conduit abutment fitting and a joint portion of a guide tube of the cable assembly of FIG. 1.
FIG. 3 is a perspective view of the joint portion of the guide tube of FIG. 2.

As best shown in FIG. 2, the illustrated first and second conduit abutment fitting assemblies 18, 18' each include a conduit abutment fitting or main body 26, 26' and the guide tubes 20, 20' forwardly extend from the conduit abutment fittings 26, 26'. The illustrated conduit abutment fittings 26, 26' are each adapted to be secured to stationary mounting brackets to form stationary locations for the ends of the conduit 14. The illustrated guide tubes 20, 20' are each secured to the conduit abutment fittings 26, 26' with a ball and socket or swivel joint 28, 28' (FIGS. 1B and 1C) so that the guide tubes 20, 20' can pivot relative to the conduit abutment fittings 26, 26'. The illustrated first conduit abutment fitting 26 is of the type which has a socket 31 formed therein and is assembled with the guide tube 20 and has a retainer or lock cap 30 which holds the assembly together. The illustrated second conduit abutment fitting 26' is of the type which is over-molded onto the guide tube 20' to form the socket 31. It is noted that the conduit abutment fitting assemblies 18, 18' can be of any suitable type depending of the requirements of the application. Because the ends of the illustrated cable assembly 10 are substantially the same with respect to the remaining description, only the first end will be described in detail hereinafter.

As best shown in FIGS. 1 to 3, the illustrated guide tube 20 is generally tubular-shaped having a generally cylindrical-shaped outer surface and a longitudinally extending central opening or passage 32. At least a forward portion of the passage 32 is sized and shaped for close sliding receipt of the core attachment 22 therein. The rearward end of the passage 32 is preferably expanded to eliminate sharp edges which may abrade the core 16 which passes into the rearward end of the passage 32. The rearward end of the illustrated guide tube 20 is provided with a generally spherical-shaped ball 34. The ball 34 is sized and shaped for receipt within the internal socket 31 of the conduit abutment fitting 26 to form the ball and socket type swivel joint 28. it is noted that the ball and socket joint 28 can be adapted to be a drop-in, push-in, snap-over, or molded-over type connection as desired. The guide tube 20 is preferably adapted to have a pull-off load of at least 180N to 650N at 20 degrees C. and preferably has an articulation angle of at least 7 degrees in all directions with an articulation force of no more than 4.5N.

As best shown in FIGS. 1 to 4, the illustrated guide tube 20 is constructed of two separate and distinct components that are secured together during assembly of the cable assembly 10 as described in more detail hereinafter. The illustrated guide tube 20 includes a joint or internal member 36 secured to and forwardly extending from the conduit abutment fitting 26 and an extension or external member 38 secured to and forwardly extending from the joint member 36. The members 36, 38 are preferably sized so that the extension member 38 covers the rearward end of the core attachment 22 throughout its stroke of axial movement, that is, the overlap between the guide tube 20 and the core attachment 22 (best shown in FIG. 16).

As best shown in FIG. 3, the joint member 36 forms the rear end of the guide tube 20. The joint member 36 is generally tubular-shaped having a generally cylindrical-shaped outer surface and a rearward portion of the longitudinally extending central opening or passage 32 extends therethrough. The joint member 36 has the ball 34 formed at the rear end thereof. The forward end of joint member 36 is provided with a plurality of circumferentially extending and axially spaced-apart grooves 40 on the outer surface which cooperate with the extension member 38 as described in more detail hereinafter. The illustrated joint member 36 has three grooves 40 but any other suitable quantity can be alternatively utilized. The joint member 36 is preferably of unitary construction and a separate component from the extension member 38 and is preferably molded of a plastic material but any other suitable material can be alternatively utilized.

Figure 4:
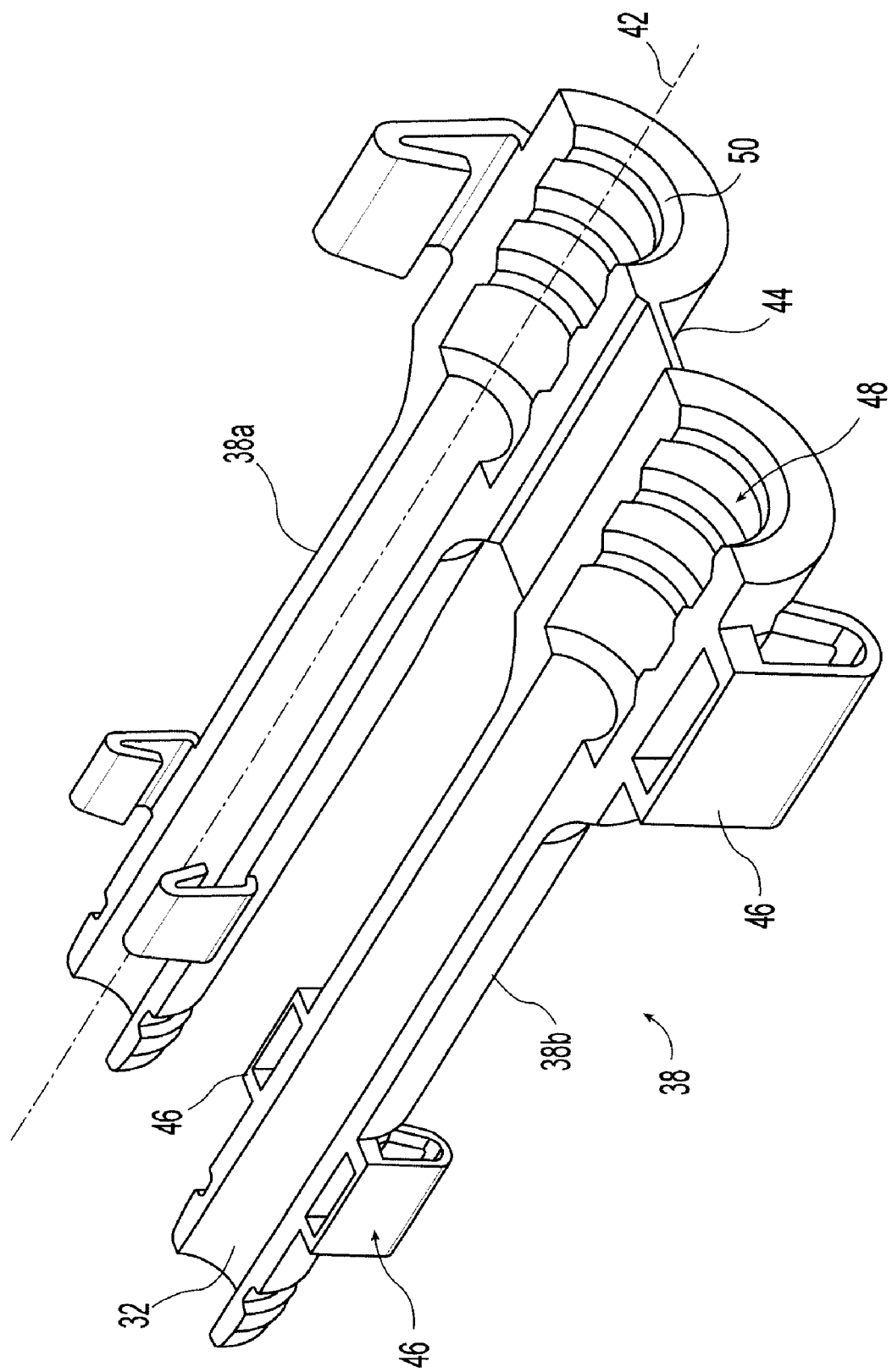
FIG. 4 is a perspective view of an extension portion of the guide tube of the cable assembly of FIG. 1.
Figure 5:
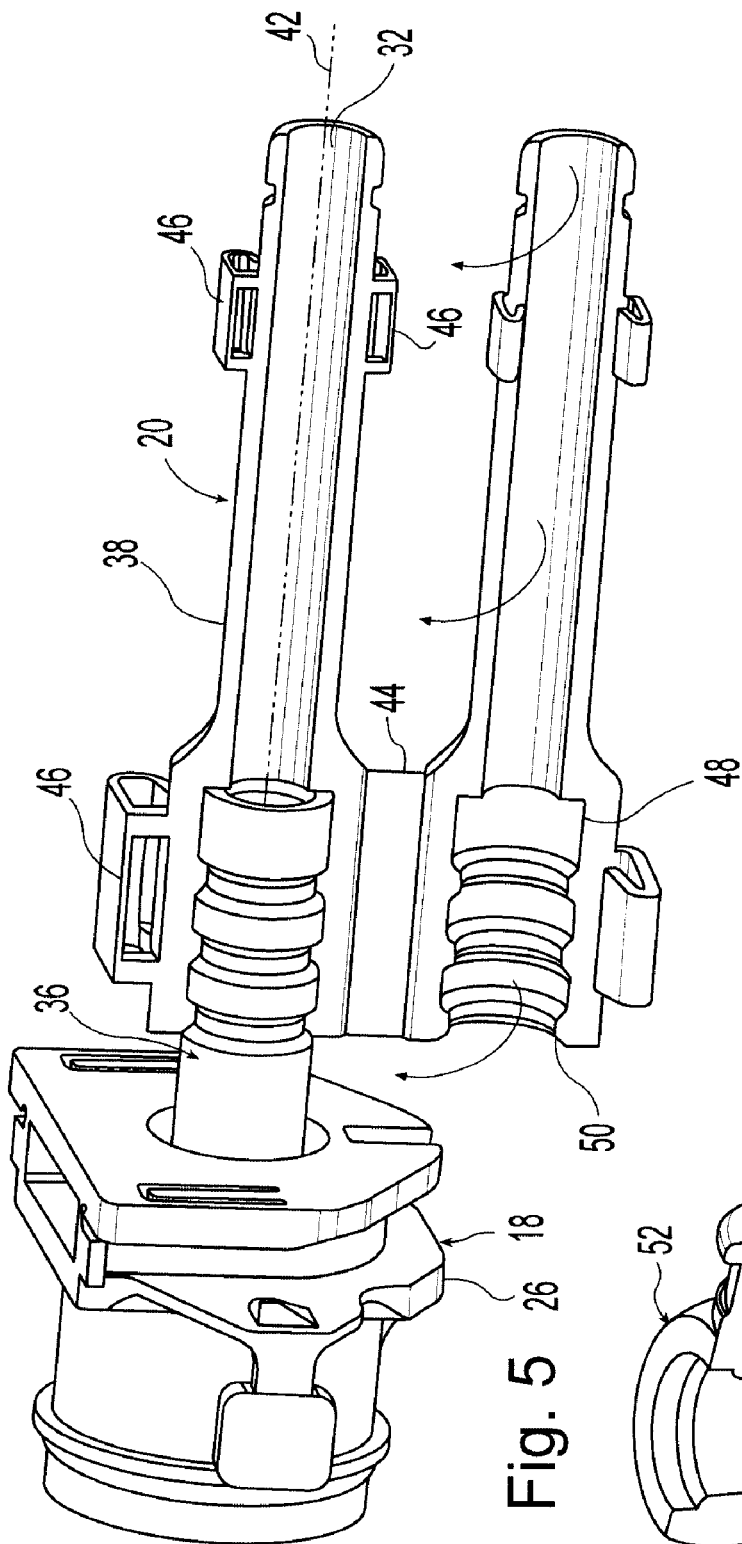
FIG. 5 is a perspective view of the extension portion of FIG. 4 being installed onto the joint portion of FIG. 3.

As best shown in FIGS. 4 and 5, the extension member 38 forms the forward end of the guide tube 20. The extension member 38 has a first or left portion 38a and a second or right portion 38b that cooperate to form a generally tubular-shape having a generally cylindrical-shaped outer surface and a forward portion of the longitudinally extending central opening or passage 32 extends therethrough. The first and second portions 38a, 38b have a parting plane that is parallel to and contains the central axis 42 of the passage 32. The illustrated first and second portions 38a, 38b are connected by a "living" or unitary hinge 44 located at a rearward end of the extension member 38. The living hinge 44 enables the extension member 38 to be formed as a unitary component that can be folded over or wrapped around the joint member 36 and the core 16 in a lateral direction rather than axially extending the core 16 through the passage 32 as described in more detail hereinafter. It is noted that the extension member 38 can alternatively be formed as two separate components and/or the extension member 38 can have more than two portions forming the passage 32. The illustrated first and second portions 38a, 38b are also provided with a plurality of snap-lock connections 46 which secure the first and second portions 38a, 38b together about the joint member 36 and the core 16. The illustrated first and second portions 38a, 38b are provided with three snap-lock connections 46: two at a forward end of the extension member 38 at opposite sides of the passage 32 and one at a rearward end of the extension member 38 at a side of the passage 32 opposite the hinge 44. It is noted that any other suitable quantity of snap-lock connections 46 can alternatively be utilized and/or that any other suitable type of connections can alternatively be utilized.

As best shown in FIGS. 4 and 5, the rearward end of the illustrated passage 32 forms a receptacle 48 for receiving the forward end of the joint member 36. The receptacle is provided with a plurality of circumferentially extending and axially spaced-apart tongues or protrusions 50 which extend into the grooves 40 of the joint member 36 to form an interlock in the axial direction to substantially prevent relative longitudinal movement between the joint member 36 and the extension member 38. It is noted that the extension member 38 and the joint member 36 can alternatively be secured together in any other suitable manner. The extension member 38 is preferably of unitary construction and a separate component from the joint member 36 and is preferably molded of a plastic material but any other suitable material can be alternatively utilized.

Figure 7:
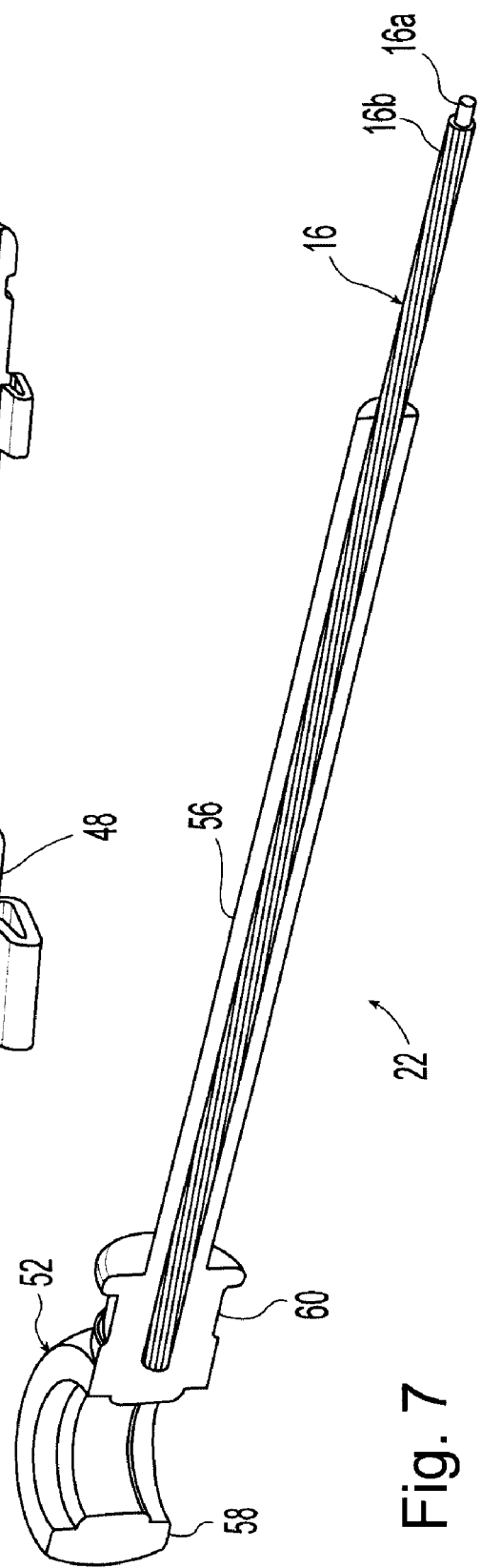
FIG. 7 is a perspective view, in cross-section, of the core attachment of FIG. 6.
Figure 6:
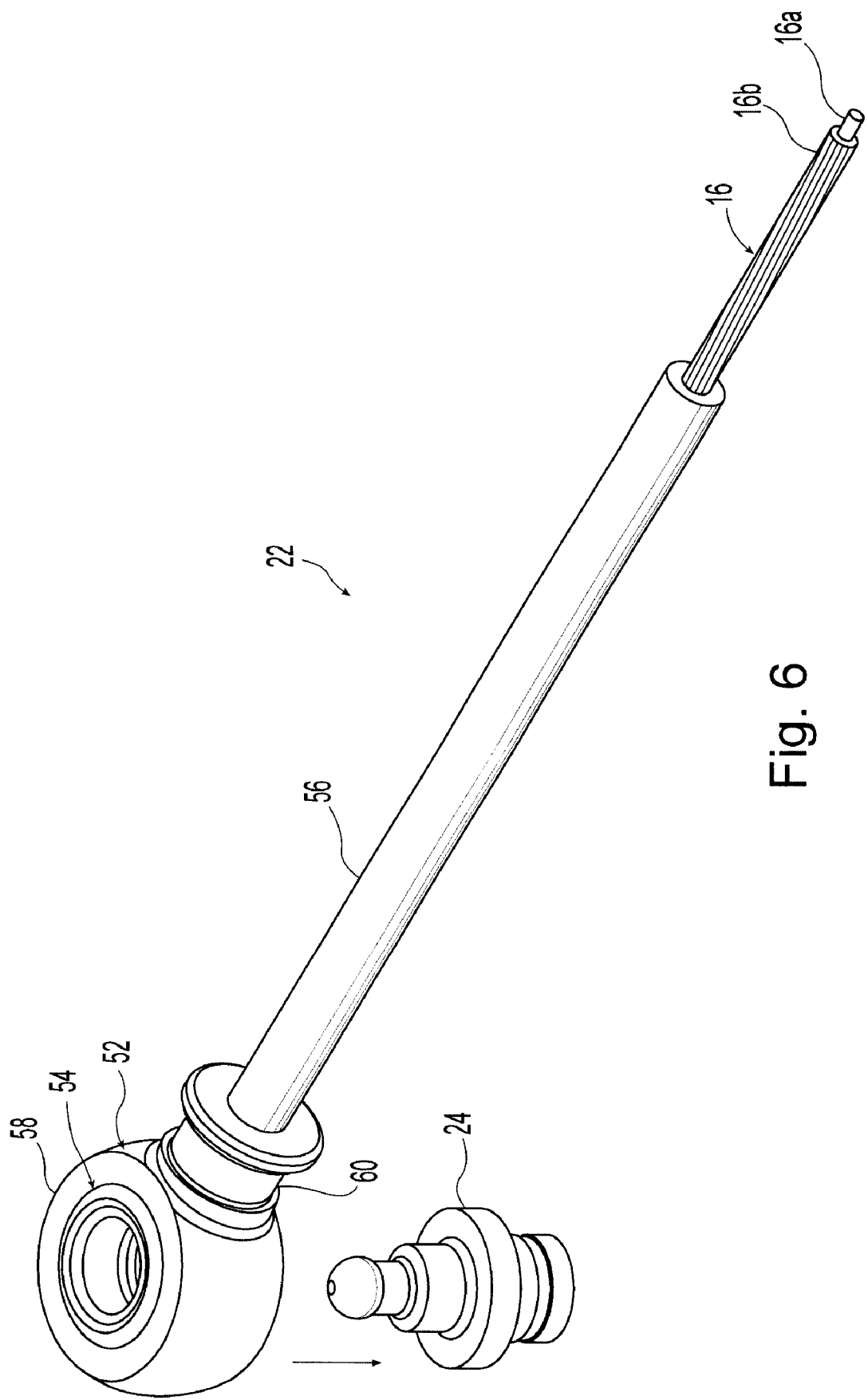
FIG. 6 is a perspective view of a core attachment of the cable assembly of FIG. 1 being installed onto a control member.

As best shown in FIGS. 6 and 7, the illustrated core attachment 22 includes a terminal 52, an isolator 54 within the terminal 52, and a rod 56 rearwardly extending from the terminal 52 and secured to the core 16. The illustrated terminal 52 has a main portion or head 58 and an end portion or attachment 60 extending rearwardly from the head 58. The illustrated head 58 is generally annular shaped and is adapted to receive the connecting pin 24 as is known in the art. The attachment 60 is generally cylindrically shaped and rearwardly from the head generally perpendicular to the head. That is, the central axis of the head 58 is substantially perpendicular to the central axis of the attachment 60. The attachment 60 is adapted to connect or attach the rod 56 to the head 58.

The isolator 54 is located within the opening of the head 58 and is sized and shaped to prevent direct contact between the head 58 and the connecting pin 24. The isolator 54 is preferably molded of a suitable vibration damping material such as an elastic polymer, rubber or the like. It is noted that alternatively the isolator 54 can be eliminated, of integral construction, and/or formed at least partially of any other suitable material. For example, the head 58 can have integral plastic prongs that contact directly with the connection pin 24.

The illustrated rod 56 is elongate and rearwardly extends from the attachment 60 of the core attachment 22. The rod 56 is sized and shaped to be slidingly received within the forward end of the passage 32 of the guide tube 20. The illustrated rod 56 is generally cylindrically shaped having a generally circular cross-section to cooperate with the guide tube passage 32 which is also generally circular in cross-section. It is noted that the rod 56 can alternatively have other suitable shapes. The illustrated terminal and rod 52, 56 are of unitary or one-piece, construction and molded of a plastic material but any other suitable material can be alternatively utilized. It is noted that alternatively, the terminal and rod 52, 56 can be constructed as separate components and secured together. For example, the rod 56 can be formed of metal rod and the terminal 52 can be formed of a plastic material over-molded onto the forward end of the rod 56.

The illustrated unitary terminal and rod 52, 56 are molded over the end of the core 16 (best seen in FIG. 7) to secure the core 16 to the rod 56. The components 16, 56 are bonded together as the plastic is formed around the core 16. The illustrated core 16 extends along the central axis of the rod 56 and the attachment 60. The illustrated core 16 extends entirely through the rod 56 and substantially through the rod end attachment 60. It is noted that the pull out strength of the core attachment 22, that is the load at which the core 16 can be separated from core attachment 22, is improved by increasing the length of the core 16 that is within the core attachment 22. The core 16 preferably extends for at least half of the length of the rod 56, and more preferably extends at least the entire length of the rod 56, and even more preferably for the entire length of the rod 56 and at least a portion of the rod end attachment 60, and even more preferably for the entire length of the rod 56 and at least a substantial portion of the rod end attachment 60. It is also noted that the core 16 can alternatively be secured to the rod 56 in any other suitable manner. For example, the rod 56 can be crimped to the core 16 when the rod 56 is formed of metal. The first core attachment 22 (which is the transmission end outside the vehicle) is preferably adapted to withstand a tension load of at least 667N at 149 degrees C. and compression load of at least 338.8N at 149 degrees C. The second core attachment 22' (which is the shifter end inside the vehicle) is preferably adapted to withstand a tension load of at least 667N at 82 degrees C. and compression load of at least 338.8N at 82 degrees C.

As best shown in FIGS. 8 and 9, the end of the core 16 can be provided with an upset 66 which will assist bonding of the core attachment 22 to the core 16 to improve the pull out load. The illustrated upset 66 is formed by compressing the end of the external wires 16b so that external wires 16b flare outwards to form an arch-shaped protrusion near the end of the core 16 which protrudes radially outward from the centerline of the core 16. The upset 66 extends radially outward a greater distance than remaining portion of the core 16 to form a mechanical lock or interlock in the axial direction which resists the core 16 from pulling out of the core attachment 22 upon the application of axial loads. It is noted that the upset 66 and/or the axial interlock can alternatively be formed in any other suitable manner.

FIG. 10 illustrates that the terminal head 58 can have other configurations. The illustrated head 58' has integral plastic prongs that contact directly with the connection pin 24. In this variation of the head 58' isolator 54 is eliminated.

FIG. 11 illustrates that the rod 56 can have other configurations. The illustrated rod 56' is substantially square in cross-section. Such non-circular cross-section can be advantageous when improved strength is desired and/or it is desired to limit rotational movement of the rod 56' within the guide tube 20. It is noted that the guide tube is provided with a cooperating shape.

As best shown in FIGS. 12 to 14, the end of the core 16 within the core attachment 22 can be provided with a wrap 68 prior to over-molding the core attachment 22 which will assist bonding of the core attachment 22 to the core 16 to improve the pull out load and to stiffen the rod 56 with regard to side loading or buckling. The illustrated wrap 68 is formed by helically wrapping a flat metal wire about the core 16. It is noted that the wrap 68 can alternatively be formed any other suitable shape of wire or formed any other suitable type of wrap such as, for example, a fiber wrap. It is noted that the wrap 68 can alternatively be formed of any other suitable material such as a plastic or other non-metallic. The illustrated wrap 68 extends substantially the entire length of core 16 within the core attachment 22. It is noted, however, that the wrap 68 can alternatively extend a shorter distance if desired. The wrap 68 is preferably wrapped in a manner to form a helical groove or gap 70 so that plastic flows into the gap 70 during the over-molding process to form an interlock in the axial direction which resists the core 16 from pulling out of the core attachment 22 upon the application of axial loads. The illustrated wrap 68 is fully contained within and sealed by the molded plastic core attachment 22 which allows metal type for the wrap 68 to be selected with out a concern for corrosion resistance. It is noted that the wrap 68 and/or the axial interlock can alternatively be formed in any other suitable manner.

Figure 15:
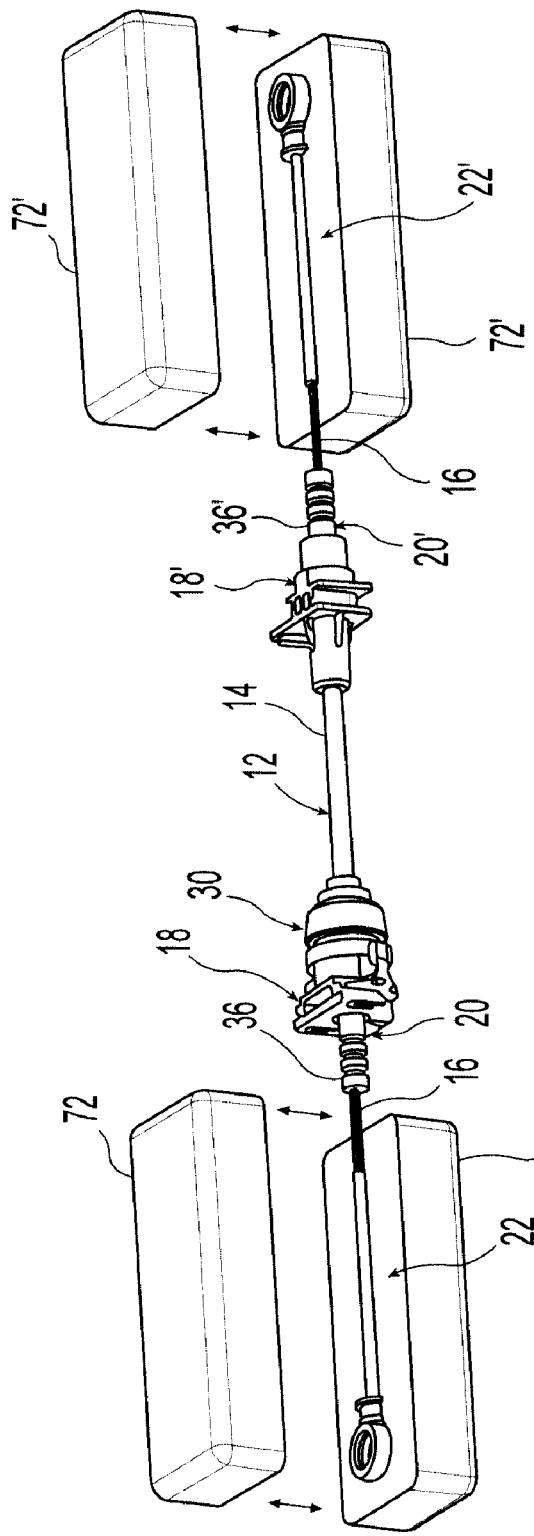
FIG. 15 is a perspective view of a molding operation during manufacture of the cable assembly of FIG. 1.
Figure 16:
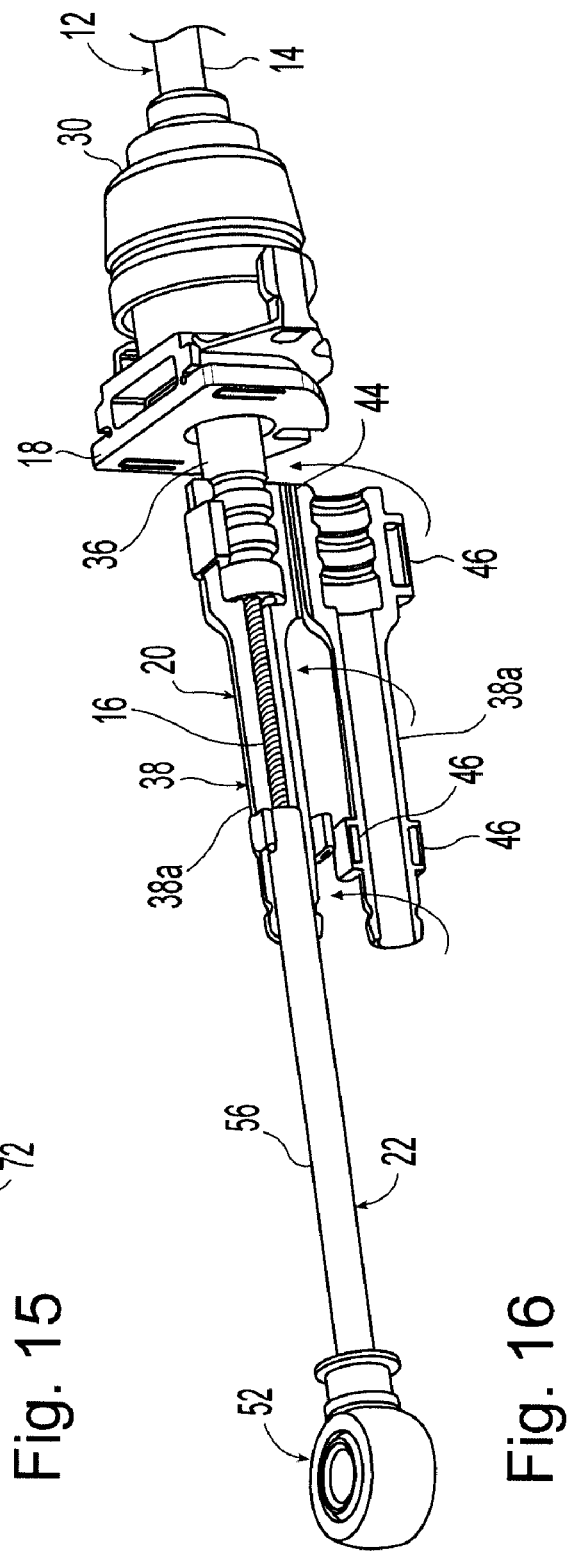
FIG. 16 is a perspective view of a guide tube attachment operation during manufacture of the cable assembly of FIG. 1.

FIGS. 15 and 16 illustrate a preferred method of manufacture for the cable assembly 10. Initially, the conduit abutment fitting assemblies 18, 18' (less the extension members 38, 38' of the guide tubes 20, 20') are secured to the cable conduit 14. The cable core 16 is then inserted through the conduit 14 and ends of the core 16 are placed into plastic injection inserts or molds 72, 72' designed to form the core attachments 22, 22'. Once the inserts 72, 72' are closed and the ends of the core 16 are located therein, plastic is injected into the molds 72, 72' to form the core attachments 22, 22' over the ends of the core 16. The finished plastic core attachments 22, 22' formed on the ends of the cable core 16 are then removed from the molds 72, 72'. The extension members 38, 38' of the guide tubes 20, 20' are then secured to the joint members 36, 36' of the guide tubes 20, 20' by wrapping the extension members 38, 38' about the rearward ends of the core attachments 22, 22' and the forward ends of the guide tube joint portions 38, 38' and securing the snap lock connections 46. It is noted that the guide tube extension members 38, 38' are attached after the core attachments 22, 22' are formed on the core 16 and thus access to the ends of the core 16 is available which permits the over-molding of the core attachments 22, 22'. It is also noted that while the above described method describes simultaneously over-molding the core attachments 22 on both ends of the core 16, alternatively the core attachments 22, 22' can be consecutively over-molded on one end and then on the other end or a core attachment can be over-molded on only one end of the core 16. Over-molding the core attachments 22, 22' consecutively or over-molding only one of the core attachments would allow the use of other types of core attachments on the other end as may be desired in some circumstances.

Figure 17:
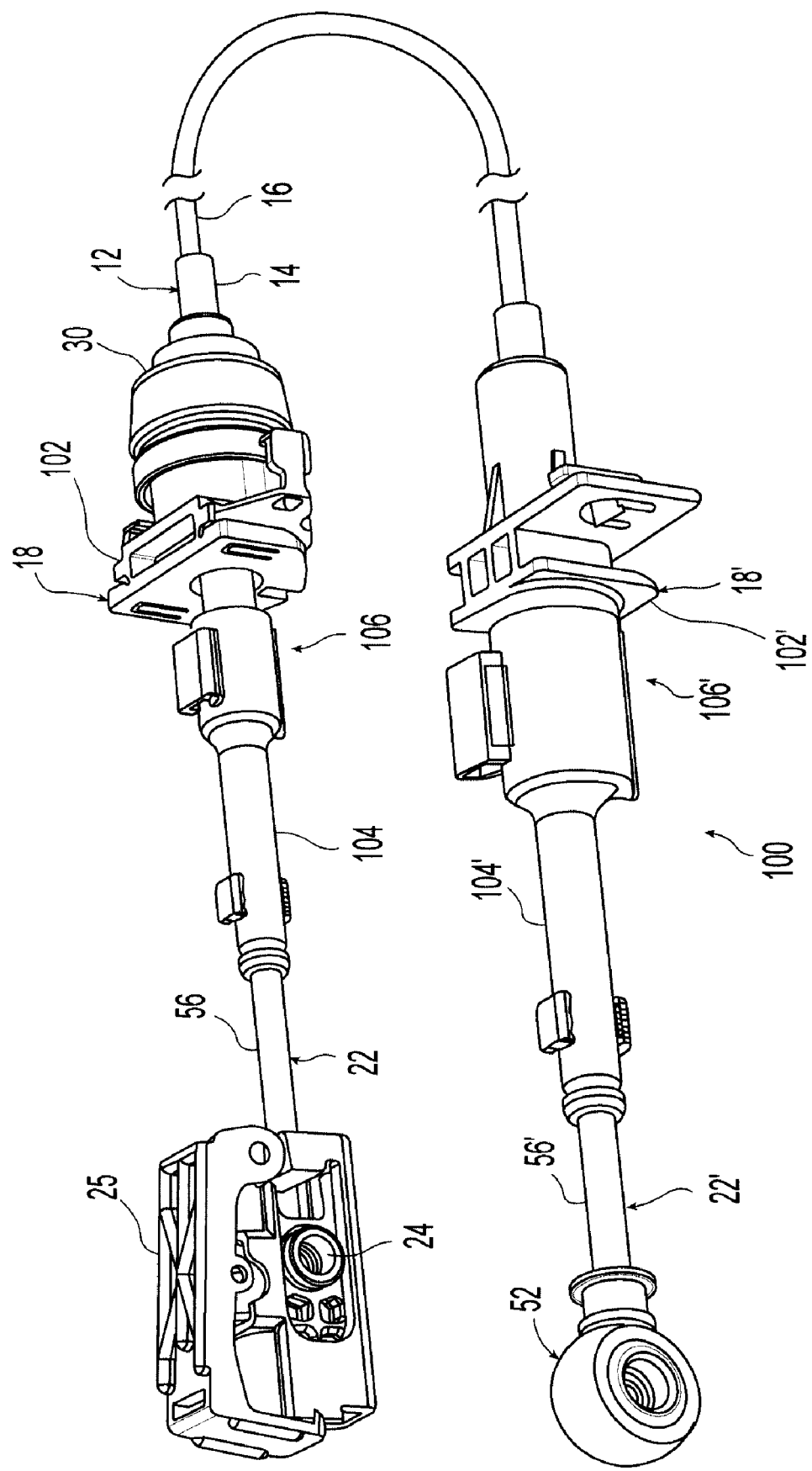
FIG. 17 is a perspective view of a push-pull cable assembly according a second preferred embodiment of the present invention.

FIG. 17 illustrates a push-pull cable assembly 100 according to a second embodiment of the present invention wherein like reference numbers are utilized to show like structure. The cable assembly 100 according to the second embodiment is substantially the same as the cable assembly 10 according to the first embodiment described hereinabove except that the conduit abutment fitting 102 and guide tube 104 form an external swivel joint 106 (that is, external of the conduit abutment fitting 102) which still permits the guide tube to be attached after the core attachments 22, 22' are over-molded or otherwise secured to the ends of the core 16. It is noted that the cable assembly 100 according to the second embodiment utilizes fewer components. It is also noted that the cable assembly 100 is provided with an adjuster 25 but can alternatively be provided with any other suitable type of adjuster.

Figure 18:
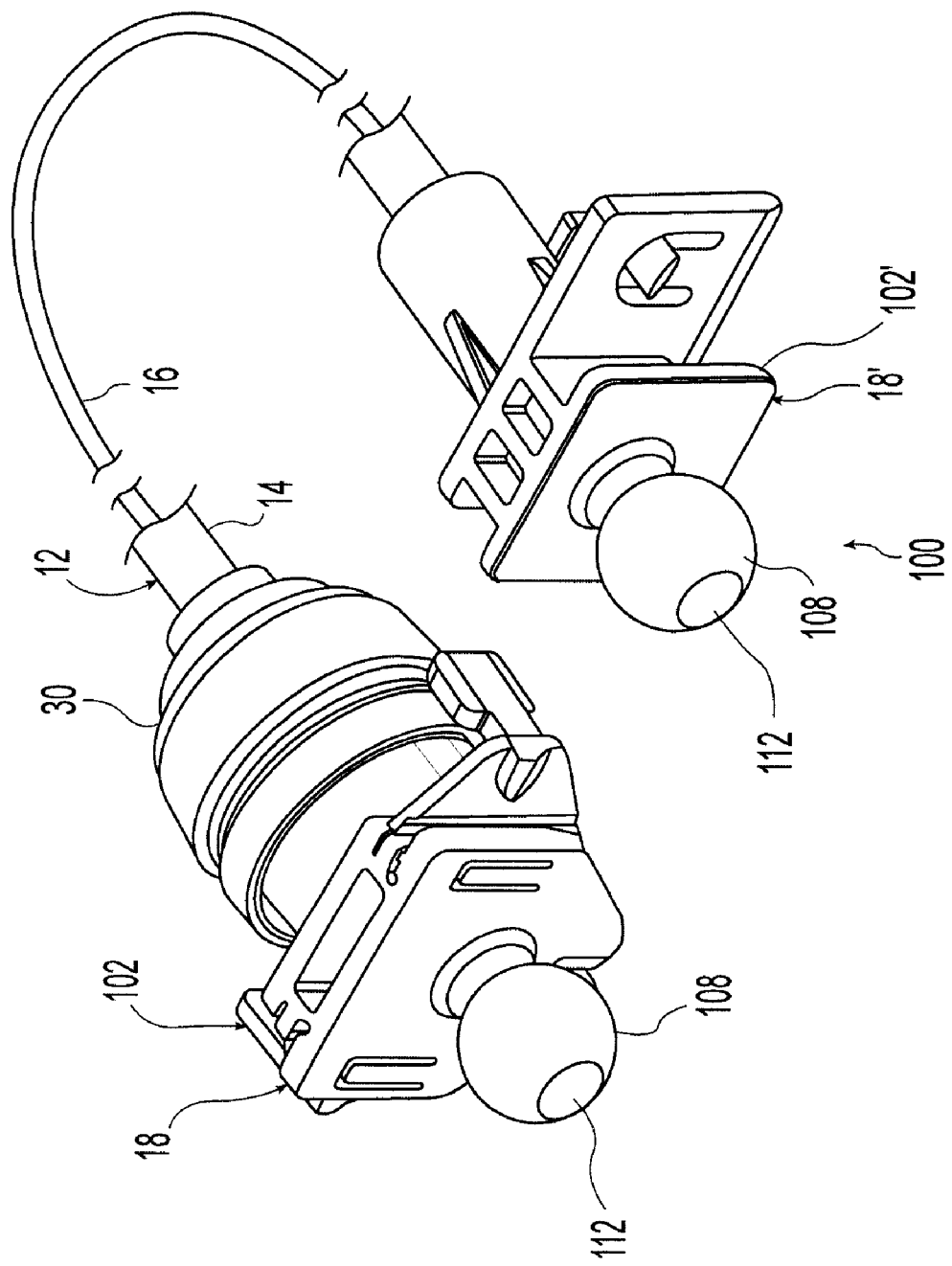
FIG. 18 is a perspective view of conduit abutment fittings of the cable assembly of FIG. 17, wherein the conduit abutment fittings have external balls for cooperation with the guide tubes.

As best shown in FIG. 18, the illustrated conduit abutment fittings 102, 102' are each provided with a forwardly-extending external ball 108 and the rear ends of the illustrated guide tubes 104, 104' are each provided with a socket 110 to form the ball and socket or swivel joints 106, 106' so that the guide tubes 104, 104' can pivot relative to the conduit abutment fittings 102, 102'. The illustrated ball 108 is provided a central opening or passage 112 which permits the passage of the core 16 therethrough. Because the assemblies at the ends of the illustrated cable assembly 100 are substantially the same with respect to the remaining description, only the first end will be described in detail hereinafter.

Figure 19:
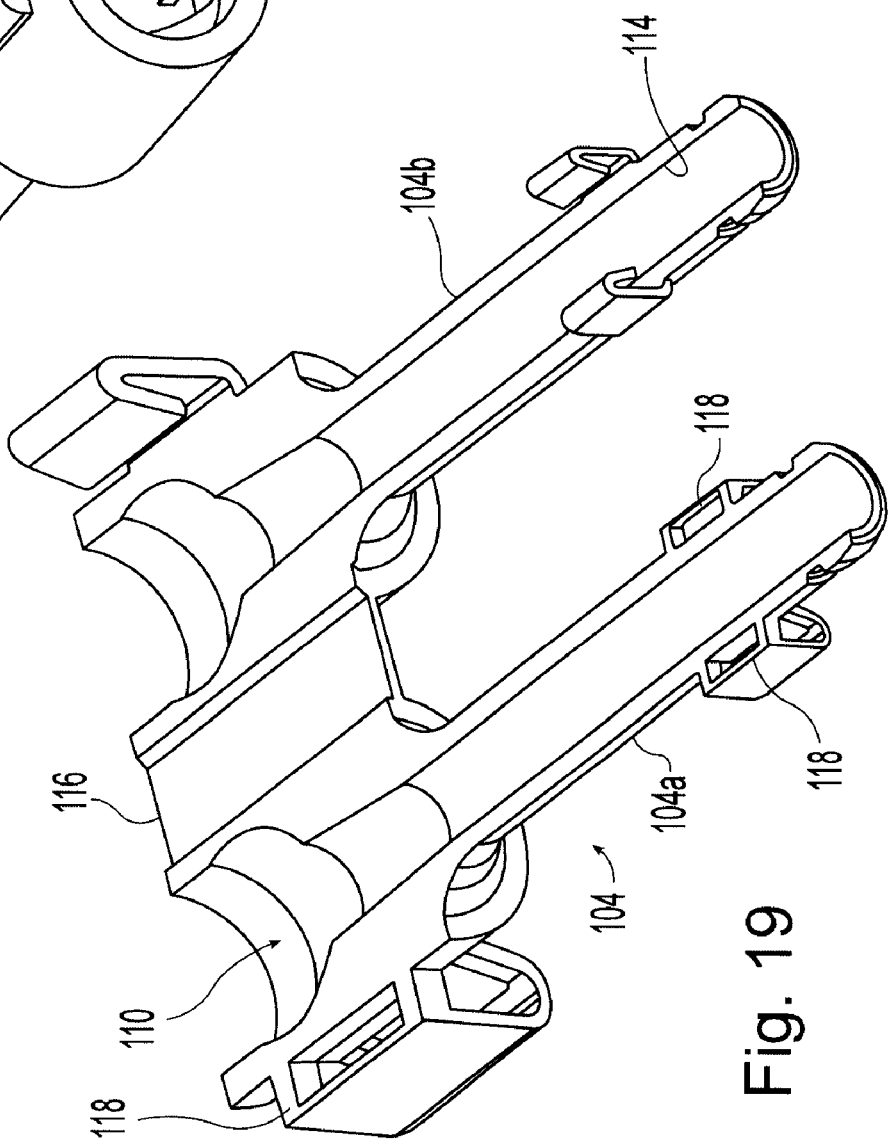
FIG. 19 is a perspective view of the guide tube for the cable assembly of FIGS. 17 and 18.
Figure 21:
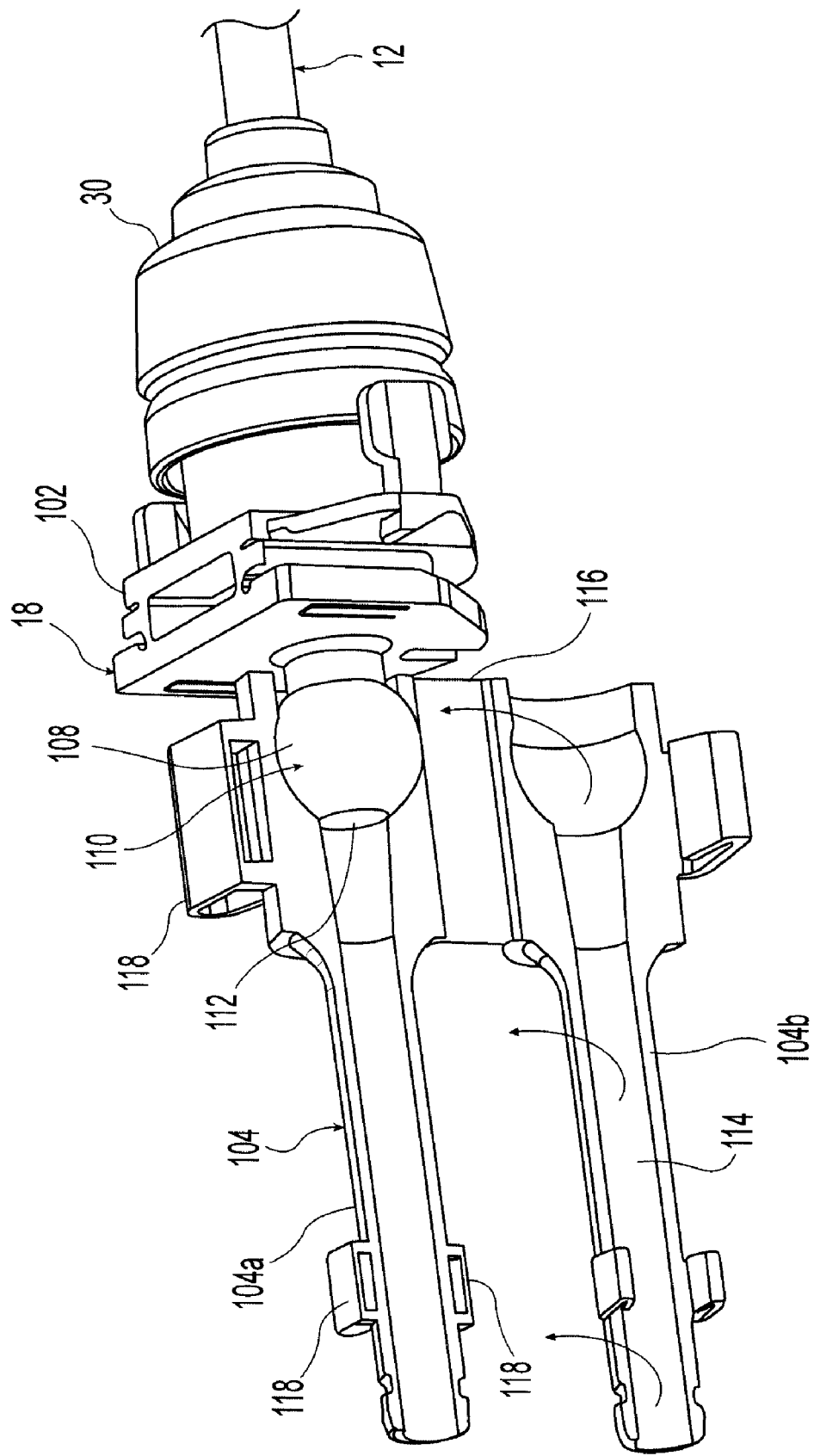
FIG. 21 is a perspective view of the guide tube of FIG. 19 being installed onto the ball of the conduit abutment fitting of FIG. 18.

As best shown in FIGS. 19 and 21, the illustrated guide tube 104 is generally tubular-shaped having a generally cylindrical-shaped outer surface and a longitudinally extending central opening or passage 114. At least a forward portion of the passage 114 is sized and shaped for close sliding receipt of the core attachment 22 therein. The rearward end of the passage 114 forms the socket 110 which is sized and shaped for receipt of the ball 108 of the conduit abutment fitting 102 to form the ball and socket or swivel joint 106.

Figure 20:
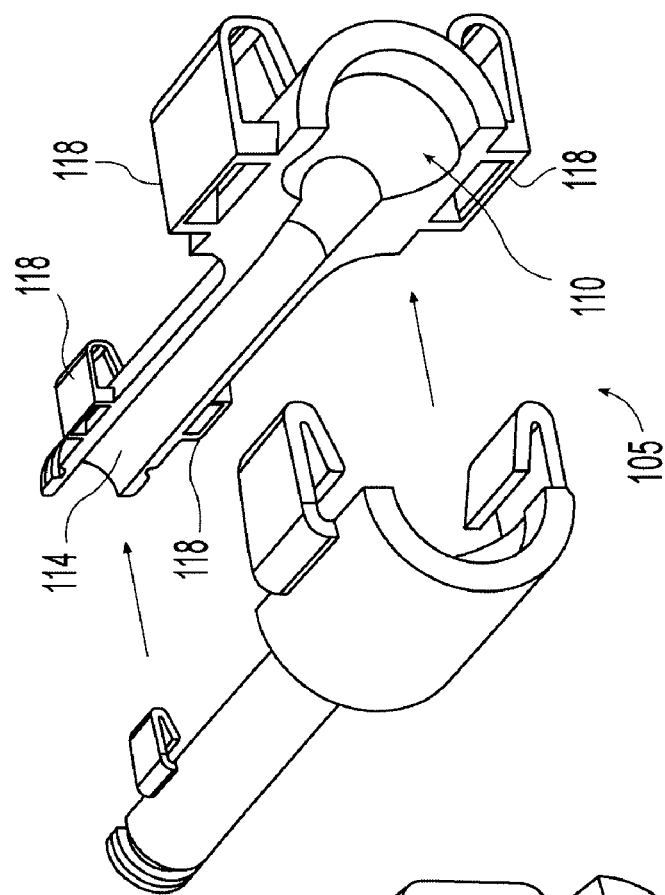
FIG. 20 is a perspective view of a variation of the guide tube of FIG. 19.

The illustrated guide tube 104 has a first or left portion 104a and a second or right portion 104b that cooperate to form the generally tubular-shape of the guide tube 104. The first and second portions 104a, 104b have a parting plane that is parallel to and contains the central axis 42 of the passage 112. The illustrated first and second portions 104a, 104b are connected by a "living" or unitary hinge 116 located at a rearward end of the guide tube. The living hinge 44 enables the guide tube 104 to be formed as a unitary single component that can be folded over or wrapped around the ball 108 of the conduit abutment fitting 102 and the core 16 in a lateral direction rather than axially extending the core 16 through the passage 112 as described in more detail hereinafter. FIG. 20 illustrates that a guide tube 105 formed as two separate components can alternatively be utilized. It is also noted that the guide tube 105 can alternatively have more than two portions forming the passage 104. The illustrated first and second portions 104a, 104b are also provided with a plurality of snap-lock connections 118 which secure the first and second portions 104a, 104b together about the conduit abutment fitting ball 108 and the core 16. The illustrated first and second portions 104a, 104b are provided with three snap-lock connections 118: two at a forward end of the guide tube 104 at opposite sides of the passage 112 and one at a rearward end of the guide tube 104 at a side of the passage 112 opposite the hinge 116. It is noted that any other suitable quantity of snap-lock connections 118 can alternatively be utilized and/or that any other suitable type of connections can alternatively be utilized. The guide tube 104 is preferably of unitary construction and is preferably molded of a plastic material but any other suitable material can be alternatively utilized.

Figure 22:
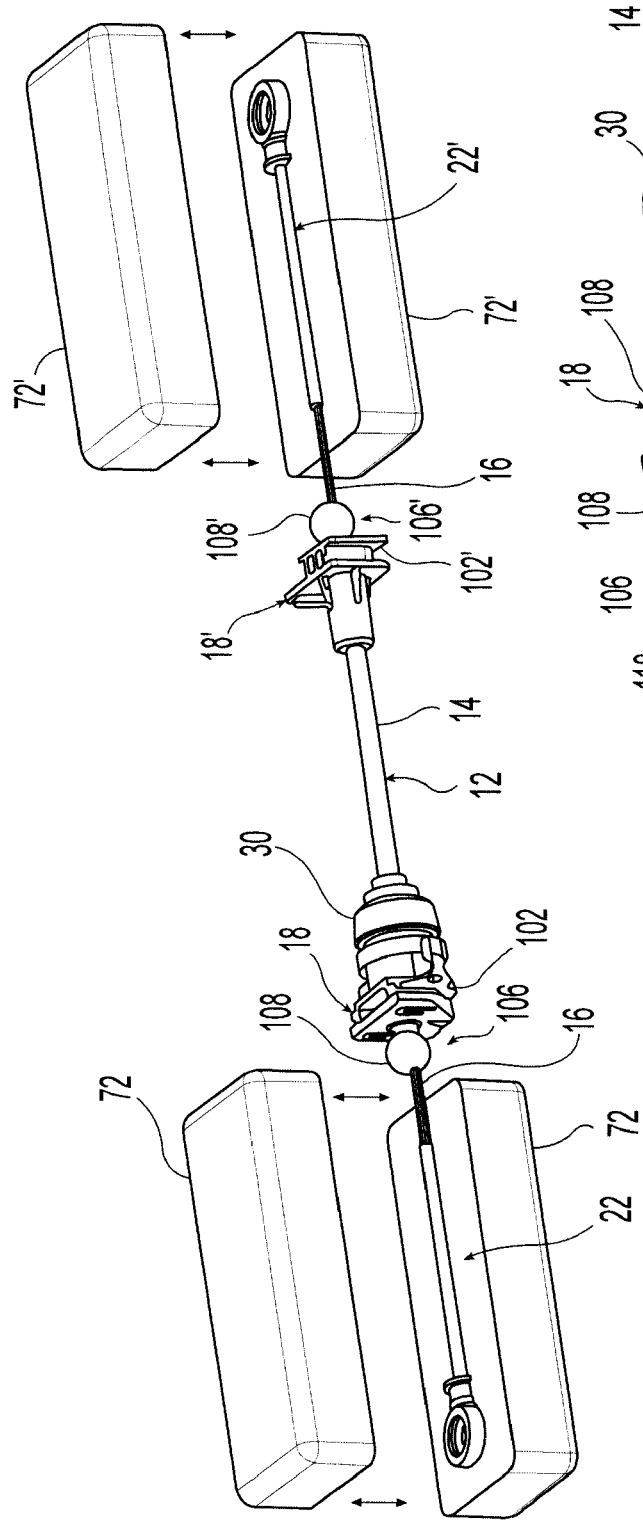
FIG. 22 is a perspective view of a molding operation during manufacture of the cable assembly of FIG. 17.
Figure 23:
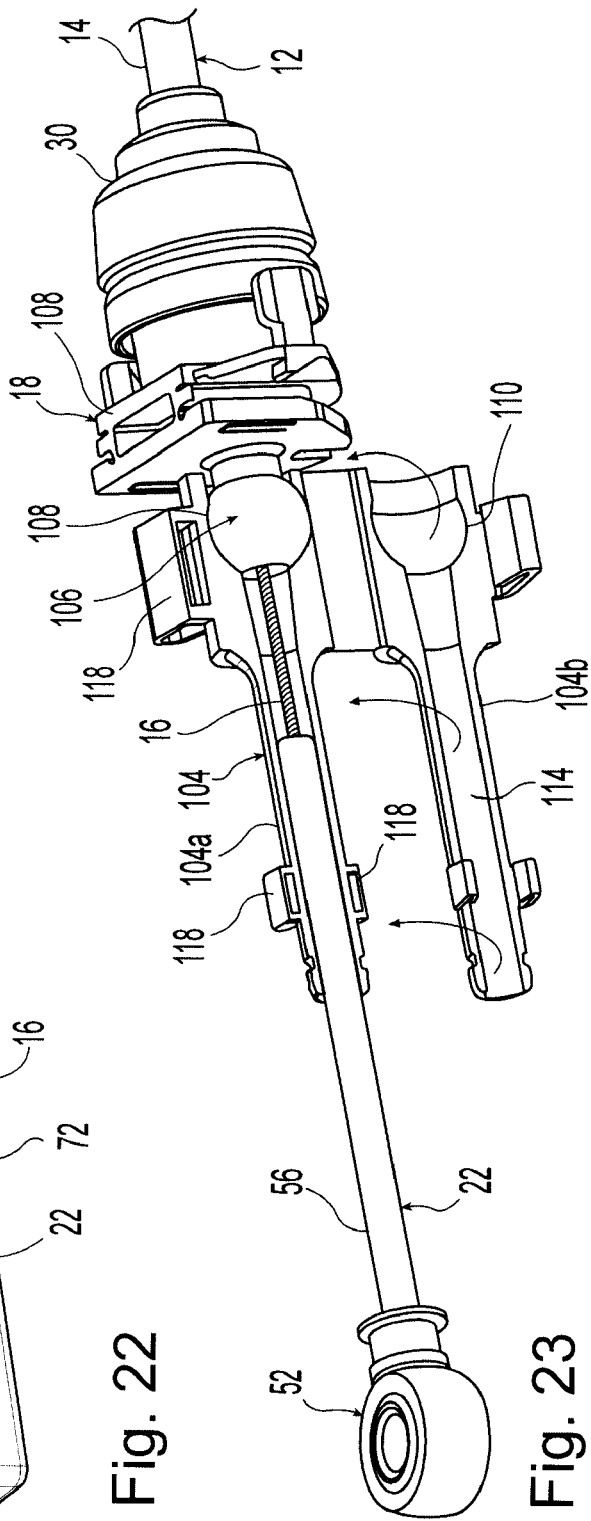
FIG. 23 is a perspective view of a guide tube attachment operation during manufacture of the cable assembly of FIG. 17.

FIGS. 22 and 23 illustrate a preferred method of manufacture for the cable assembly 100 according to the second embodiment of the invention. Initially, the conduit abutment fitting assemblies 18, 18' (less the guide tubes 104, 104') are secured to the cable conduit 14. The cable core 16 is then inserted through the conduit 14 and ends of the core are placed into plastic injection inserts or molds 72, 72' designed to form the core attachments 22, 22'. Once the inserts 72, 72' are closed and the ends of the core 16 are located therein, plastic is injected into the molds 72, 72' to form the core attachments 22, 22' over the ends of the core 16. The finished plastic core attachments 22, 22' formed on the ends of the cable core 16 are then removed from the molds 72, 72'. The guide tubes 104, 104' are then secured to the balls 108, 108' of the guide the conduit abutment fittings 102, 102' by wrapping the guide tubes 104, 104' about the rearward ends of the core attachments 22, 22' and the balls 108, 108' and securing the snap lock connections 118. It is noted that the guide tubes 104, 104' are attached after the core attachments 22, 22' are formed on the core 16 and thus access to the ends of the core 16 is available which permits the over-molding of the core attachments 22, 22'. It is also noted that while the above described method describes simultaneously over-molding the core attachments 22 on both ends of the core 16, alternatively the core attachments 22, 22' can be consecutively over-molded on one end and then on the other end or a core attachment can be over-molded on only one end of the core 16. Over-molding the core attachments 22, 22' consecutively or over-molding only one of the core attachments would allow the use of other types of core attachments on the other end as may be desired in some circumstances.

It is apparent from the foregoing disclosure that the cable assemblies according to the present invention permits easy formation of plastic core attachments and eliminates costly steel components and their associated costly manufacturing steps. Because at least a portion of the guide tube which covers the end of the core attachment can be laterally secured about the core, there is increased access to the juncture between the core attachment and the core. This permits the ability to manufacture the cable assemblies with different methods of construction for the core attachments which in turn permits multiple designs for the core attachments that were previously unobtainable or cost prohibitive. Additionally, the cable assemblies of the present invention reduce the number of components required and allow for the completion of the guide tubes as the final step. Furthermore, the cable assemblies according to the present invention enable the production of an entirely plastic or nearly entirely plastic cable assembly for reduced cost and weight and improved corrosion resistance.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method of manufacturing a motion transmitting cable assembly having a conduit and a core longitudinally movable within the conduit, said method comprising the steps of, in combination:

securing a conduit abutment fitting to an end of the conduit;
inserting the core through the conduit;

placing an end of the core into a mold while the core is extending through the conduit;

injection over-molding a core attachment onto the end of the core;

removing the core attachment from the mold;

attaching at least a portion of a guide tube over the juncture of the core and the core attachment;

providing the guide tube including separately formed first and second members;

securing the first member to the conduit abutment fitting prior to extending the core through the conduit;

providing the second member split along its longitudinal axis to form first and second portions; and laterally attaching the first and second portions over the core and the core attachment at the juncture of the core attachment and the core.

2. The method according to claim 1, further comprising the step of securing the first member to the conduit abutment fitting with a swivel joint.

3. A method of manufacturing a motion transmitting cable assembly having a conduit and a core longitudinally movable within the conduit, said method comprising the steps of, in combination:

securing a conduit abutment fitting to an end of the conduit;
inserting the core through the conduit;
placing an end of the core into a mold while the core is extending through the conduit;
injection over-molding a core attachment onto the end of the core;
removing the core attachment from the mold;
attaching at least a portion of a guide tube over the juncture of the core and the core attachment;
providing the guide tube split along its longitudinal axis to form first and second portions; and
laterally attaching the first and second portions over the core and the core attachment at the juncture of the core attachment and the core.

4. The method according to claim 3, further comprising the step of securing the guide tube to the conduit abutment fitting with a swivel joint.

5. A method of manufacturing a motion transmitting cable assembly having a conduit and a core longitudinally movable within the conduit, said method comprising the steps of, in combination:

securing a conduit abutment fitting to an end of the conduit;
inserting the core through the conduit;
placing an end of the core into a mold while the core is extending through the conduit;
injection over-molding a core attachment onto the end of the core;
removing the core attachment from the mold;
attaching at least a portion of a guide tube over the juncture of the core and the core attachment;
molding the core attachment as a unitary component including a terminal and a rod with the core extending within the rod for at least a portion of the length of the rod; and
extending the core within the rod for at least the entire length of the rod.

6. The method according to claim 5, further comprising the step of extending the core within the rod for the entire length of the rod and a portion of the terminal.

7. A method of manufacturing a motion transmitting cable assembly having a conduit and a core longitudinally movable within the conduit, said method comprising the steps of, in combination:

securing a conduit abutment fitting to an end of the conduit;
inserting the core through the conduit;
placing an end of the core into a mold while the core is extending through the conduit;
injection over-molding a core attachment onto the end of the core;
removing the core attachment from the mold;
attaching at least a portion of a guide tube over the juncture of the core and the core attachment; and
providing the core with an upset within the core attachment.

8. A method of manufacturing a motion transmitting cable assembly having a conduit and a core longitudinally movable within the conduit, said method comprising the steps of, in combination:

securing a conduit abutment fitting to an end of the conduit;
inserting the core through the conduit;
placing an end of the core into a mold while the core is extending through the conduit;
injection over-molding a core attachment onto the end of the core;
removing the core attachment from the mold;
attaching at least a portion of a guide tube over the juncture of the core and the core attachment; and
providing the core with a wire wrap within the core attachment.

9. A method of manufacturing a motion transmitting cable assembly having a conduit and a core longitudinally movable within the conduit, said method comprising the steps of, in combination:

securing a first conduit abutment fitting to a first end of the conduit and a second conduit abutment fitting to a second end of the conduit;
inserting the core through the conduit;
placing a first end of the core into a first mold while the core is extending through the conduit;
placing a second end of the core into a second mold while the core is extending through the conduit;
simultaneously injection over-molding first and second core attachments onto the first and second ends of the core respectively;
removing the first and second core attachments from the molds;
attaching at least a portion of a first guide tube over the juncture of the core and the first core attachment; and
attaching at least a portion of a second guide tube over the juncture of the core and the first core attachment.

10. The method according to claim 9, further comprising the steps of providing at least one of the first guide tube including separately formed first and second members, securing the first member to the first conduit abutment fitting prior to extending the core through the conduit, providing the second member split along its longitudinal axis to form first and second portions; and laterally attaching the first and second portions over the core and the first core attachment at the juncture of the first core attachment and the core.

11. The method according to claim 10, further comprising the step of securing the first member to the first conduit abutment fitting with a swivel joint.

12. The method according to claim 9, further comprising the steps of providing at least the first guide tube split along its longitudinal axis to form first and second portions, and laterally attaching the first and second portions over the core and the first core attachment at the juncture of the first core attachment and the core.

13. The method according to claim 12, further comprising the step of securing the first guide tube to the first conduit abutment fitting with a swivel joint.

14. The method according to claim 9, further comprising the step of molding at least the first core attachment as a unitary component including a terminal and a rod with the core extending within the rod for at least a portion of the length of the rod.

15. The method according to claim 14, further comprising the step of extending the core within the rod for at least the entire length of the rod.

16. The method according to claim 15, further comprising the step of extending the core within the rod for the entire length of the rod and a portion of the terminal.

17. The method according to claim 9, further comprising the step of providing the core with an upset within the first core attachment.

18. The method according to claim 9, further comprising the step of providing the core with a wire wrap within the first core attachment.

* * * * *